United States Patent [19]

Merritt

[11] Patent Number: 5,560,326
[45] Date of Patent: Oct. 1, 1996

[54] INTERNAL COMBUSTION ENGINE

[75] Inventor: Dan Merritt, Coventry, England

[73] Assignee: Coventry University, Coventry, United Kingdom; a part interest

[21] Appl. No.: 264,320

[22] Filed: Jun. 23, 1994

[30] Foreign Application Priority Data

| Jun. 26, 1993 | [GB] | United Kingdom | 9313258 |
| Oct. 13, 1993 | [GB] | United Kingdom | 9321126 |
| Feb. 24, 1994 | [GB] | United Kingdom | 9403548 |

[51] Int. Cl.$^6$ .................................................. F02B 75/04
[52] U.S. Cl. .................................. 123/51 AA; 123/259
[58] Field of Search .................................. 123/253, 259, 123/265, 51 R, 51 A, 51 B, 51 AA, 51 BA

[56] References Cited

U.S. PATENT DOCUMENTS

| 1,763,563 | 6/1930 | Ostberg | 123/253 |
| 1,889,650 | 11/1932 | Fredricksen . | |
| 1,917,707 | 6/1933 | Wolf | 123/51 AA |
| 2,937,630 | 5/1960 | Norton | 123/51 AA |
| 4,070,999 | 1/1978 | Matsuno | 123/59 |
| 4,104,995 | 8/1978 | Steinbock | 123/51 AA |
| 4,106,445 | 8/1978 | Beveridge | 123/DIG. 4 |
| 4,258,680 | 3/1981 | Eckart | 123/254 |
| 4,363,295 | 12/1982 | Brandly | 123/51 BA |
| 4,378,764 | 4/1983 | Jorgensen | 123/307 |
| 4,384,553 | 5/1983 | Schechter | 123/143 |
| 4,483,289 | 11/1984 | Paul et al. | 123/263 |
| 4,485,779 | 12/1984 | Spurk | 123/289 |
| 4,532,899 | 8/1985 | Lorts | 123/292 |
| 4,580,532 | 4/1986 | Jackson | 123/312 |
| 4,586,465 | 5/1986 | Krogdahl | 123/48 C |
| 4,759,319 | 7/1988 | Merritt | 123/51 AA |
| 4,898,126 | 2/1990 | Merritt | 123/272 |
| 4,981,114 | 1/1991 | Skopil | 123/51 AA |
| 5,009,207 | 4/1991 | Merritt | 123/261 |
| 5,060,609 | 10/1991 | Merritt | 123/256 |
| 5,117,789 | 6/1992 | Merritt | 123/289 |

FOREIGN PATENT DOCUMENTS

| 1035955 | 9/1953 | France . |
| 2261028 | 5/1993 | United Kingdom . |
| 2272941 | 6/1994 | United Kingdom . |

Primary Examiner—David A. Okonsky
Attorney, Agent, or Firm—Ware, Fressola, Van Der Sluys & Adolphson

[57] ABSTRACT

An internal combustion engine comprises one or more pairs of first and second cylinders, the first cylinder having a larger swept volume than the second cylinder and respective first and second pistons reciprocable in the cylinders. The second piston has a drive stem and divides the second cylinder into a first volume containing the drive stem of the second piston and a second volume between the two pistons. An air inlet and an exhaust outlet are provided for the first cylinder. A common combustion space is formed between the pistons when the pistons are substantially at their inner dead center positions, the combustion space comprising the second volume. A transfer means enables gas flow between the first volume and the combustion space towards the end of the compression stroke while an inhibiting means inhibits the movement of fuel/air mixture from the first volume into the second volume until towards the end of the compression stroke of the second piston. A fuel injector provides fuel to the first volume during the induction stroke of the second piston. The engine also has drive means for driving the second piston, the drive means including means for maintaining the second piston substantially at its inner dead center position during at least a portion of the expansion stroke of the first piston.

76 Claims, 14 Drawing Sheets

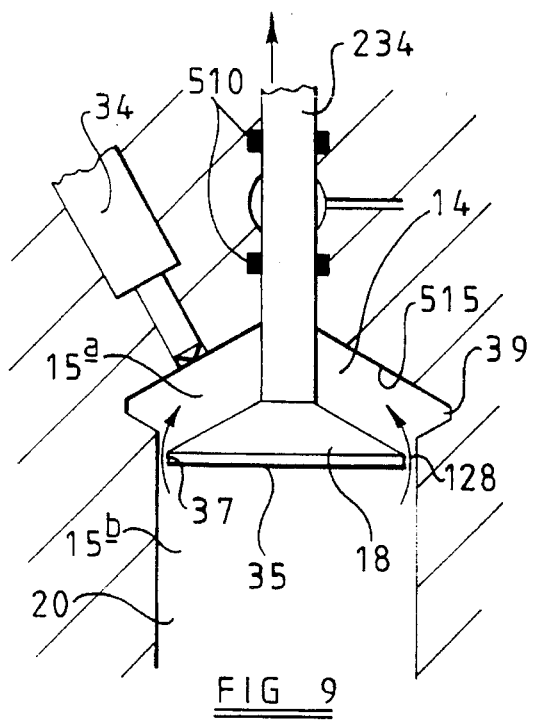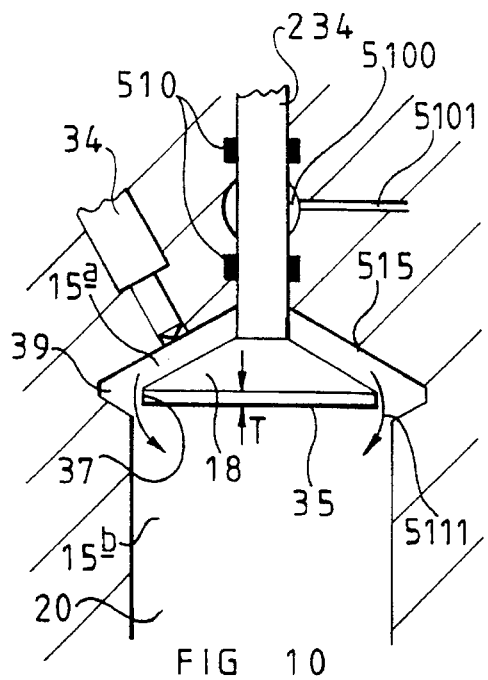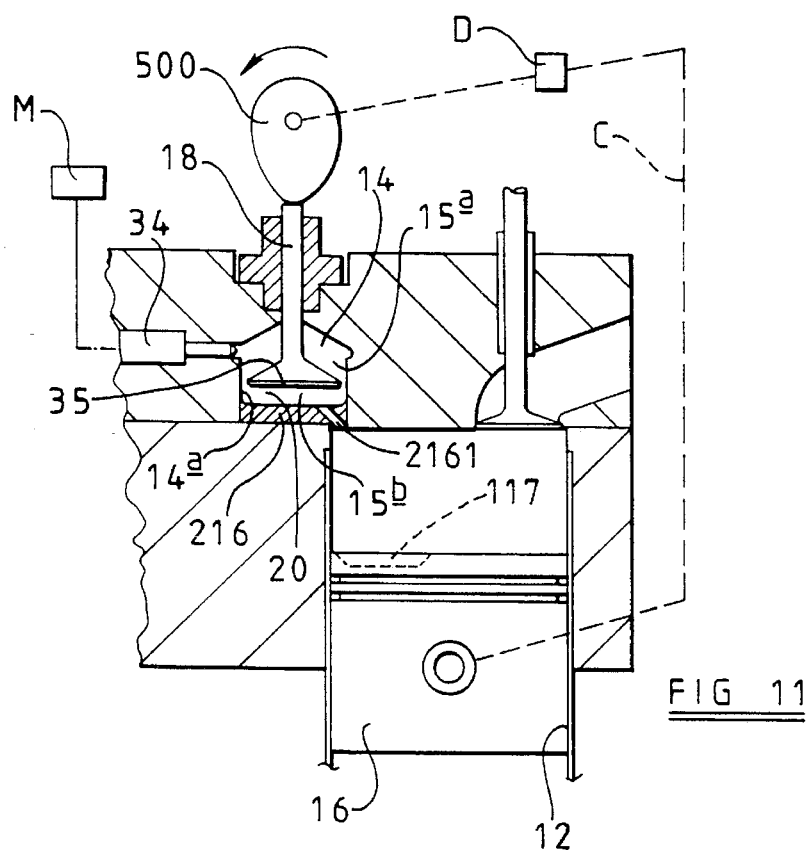

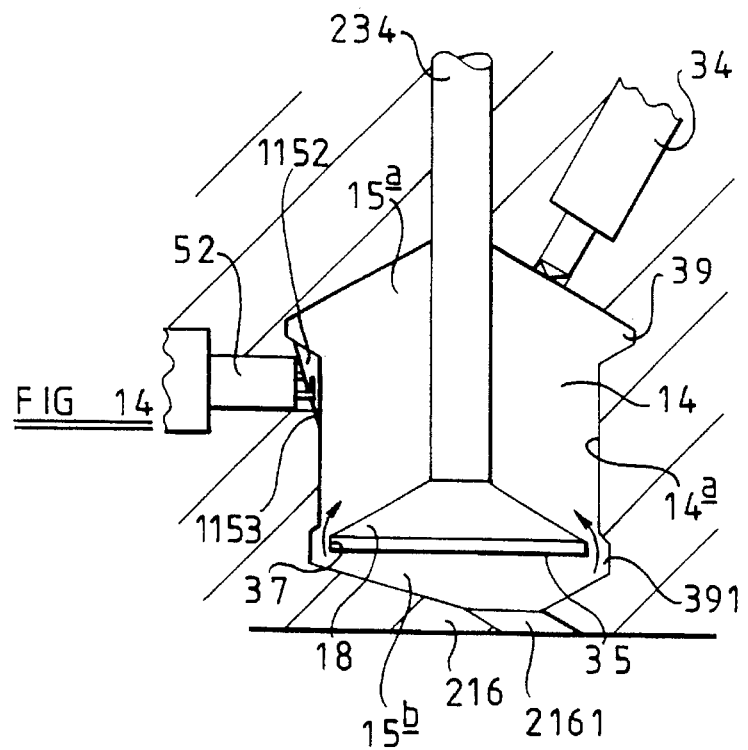
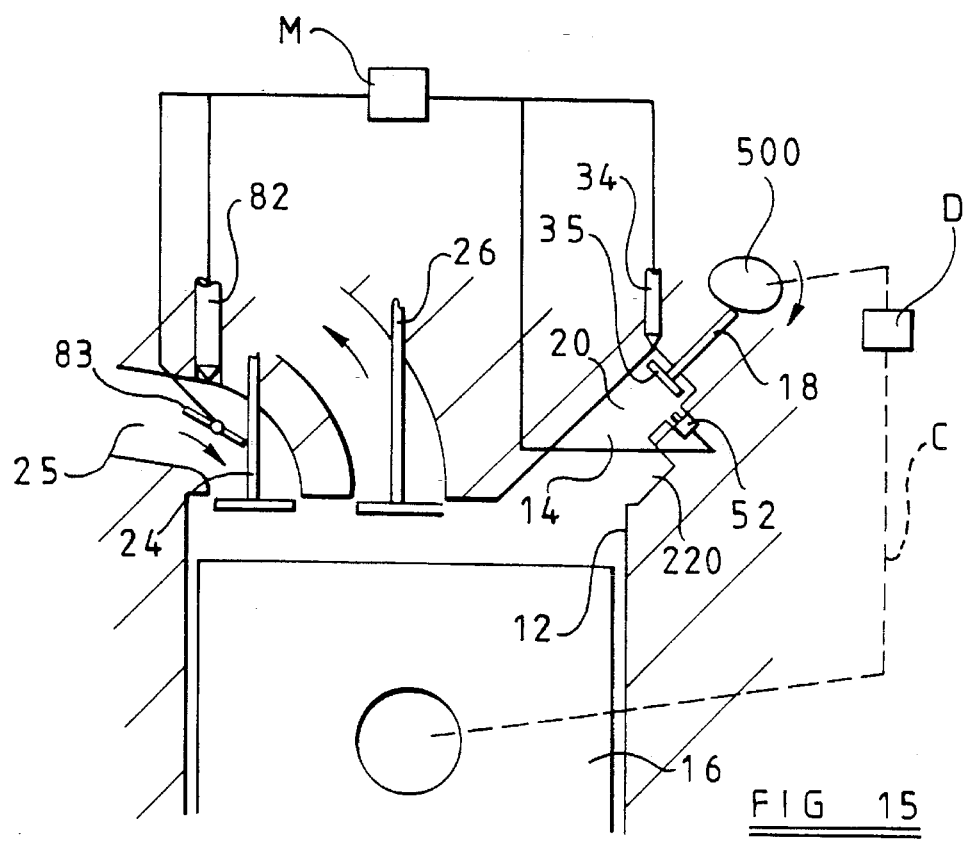

INTERNAL COMBUSTION ENGINE

FIELD OF THE INVENTION

The present invention relates to an internal combustion engine.

A "segregating engine" is an engine where the fuel does not begin to mix with the bulk of the air inducted by the engine until near the end of the compression stroke, just before ignition, and various internal Combustion engines which can be classified as segregating engines are known, for example from U.S. Pat. Nos. 4,759,319, 4,898,126, 5,009,207, 5,060,609 and 5,117,789. Those engines are now known in the literature as the Merritt engines.

The diesel engine is also a segregating engine whereas the spark ignition gasoline engine (SIGE) compresses a premixed mixture of fuel and air.

An important characteristic of Segregating engines such as the diesel and Merritt engines is the confinement of the fuel, away from the air, until just before the moment of ignition, and the rapid delivery of the fuel into the combustion chamber near the end of the compression stroke.

The Merritt engines use what is referred to as the Merritt combustion management system (MCC) which represents a sequence of processes designed to promote combustion in a reciprocating combustion engine. In this respect it is similar to the other generic combustion management systems, such as diesel and Otto, or SIGE. MCC can be operated by a number of devices which are described in the earlier patent specifications mentioned above. MCC is characterised by the segregation of at least part of the fuel supplied to the engine in a second, smaller cylinder containing some air having a smaller piston, and the introduction of the fuel into the smaller cylinder during the induction and/or compression strokes of the larger piston. The fuel remains segregated from the bulk of the air until ingression occurs, near the end of the compression strokes of both pistons. This arrangement allows the fuel appreciable time to vaporise in some air before combustion starts, in contrast with the diesel segregating engine where liquid fuel is first injected into air just before the moment of ignition. In the MCC system the smaller cylinder is used as a vaporising cylinder and the smaller piston is used as a fuel transfer piston. Hence the smaller cylinder can be referred to as the fuel management cylinder. The larger cylinder receives the air, unthrottled and without fuel, and the larger piston is used to compress the air.

The following terms when used herein have the following meanings:

Fuel Ratio—F
The ratio of the quantity of fuel actually supplied to the engine to the quantity of fuel required to use up all the oxygen in the mass of air needed to fill the combined swept volumes of both the larger and smaller cylinders when the intake air duct is unthrottled.

Air
This refers to any suitable mixture of oxygen with other usually inert gases as well as substantially pure oxygen for combustion with gaseous or liquid (i.e. vaporised liquid) fuel. It may contain recirculated exhaust gases, crankcase gases and a small proportion of hydrocarbon substances present in recirculated internal combustion engine gases.

SIGE
The conventional spark ignited gasoline engine.

STCI—(Spark Triggered Compression Ignition)
A process of compression ignition of partially vaporised fuel mixing with air, which is triggered by a spark.

Outer dead centre position
The piston position which occurs when a piston changes its direction of movement on exposing the largest volume within its cylinder.

Inner dead centre position
The piston position which occurs when a piston changes its direction of movement on exposing the smallest volume within its cylinder.

Rest stroke
The period during an engine cycle when the smaller piston remains stationary.

BMEP
Brake mean effective pressure on the larger piston.

The following terms when used herein in relation to the prior art have the following meanings:

Ingression
The movement, influenced by the smaller piston, of fuel/air mixture characteristic of the Merritt engines from the second cylinder into the combustion space.

Segregation
The confinement, within the smaller cylinder, of the fuel delivered to the smaller cylinder, until ingression starts.

DESCRIPTION OF THE PRIOR ART

The diesel engine
In the diesel engine, following fuel injection and to facilitate mixing of fuel and air, the engine can be constructed in three arrangements which are well known and are illustrated as follows:

1. The direct injection diesel engine (known as DI), shown in FIG. 1
2. The indirect injection diesel engine (known as IDI), shown in FIG. 2
3. The intermediate injection, or piston plugged indirect injection diesel engine (referred to as INI), shown in FIG. 3.

The DI diesel engine shown in FIG. 1 has an open combustion chamber 20 formed in the piston 16 crown. Air enters the cylinder 12 through inlet duct 25 and inlet valve 24 where swirl motion is imparted to it. A fuel injector 60 injects a number of jets of liquid fuel into the combustion chamber where the swirling air mixes With it before and during the combustion process.

The IDI diesel engine shown in FIG. 2 has a separate semi-enclosed combustion chamber 20 which communicates with cylinder 12 through an aperture 42. The aperture imparts swirl to the air entering the Combustion chamber during the compression stroke and fuel is injected into the chamber by a fuel injector 60 which is commonly of the pintle type, using fuel line pressures of around 100 bar or less. During the expansion stroke hot gases emerge from the aperture 42 with a high velocity and this assists unburnt fuel to mix with further air contained in parasitic volumes, particularly in valve cavities 424 and in the bump clearance above piston 16.

The INI diesel arrangement shown in FIG. 3 has been described in GB-A-0241398, GB-A-0361202, GB-A-0523137, GB-A-2088952 and others. This arrangement uses a projection 116 on piston 16, which enters an enlarged aperture in the combustion chamber 20. The projection includes a smaller aperture 161 which serves the same purpose as the aperture 42 of the indirect diesel engine of FIG. 2. In this arrangement the engine behaves as an IDI diesel engine when the piston reaches the vicinity of its inner dead centre position and behaves as a DI diesel engine at all other times.

The Merritt engine

The Merritt engine in its basic pure form is a segregating engine like the diesel engine but with very important differences. Some small quantity of air is mixed with substantially all the fuel in the smaller second cylinder over a substantial part of the engine cycle, allowing the fuel time to vaporise before ingression. Ingression into the combustion chamber takes place through a larger aperture and combustion is faster and starts without delay.

Referring now to the Merritt Combustion management system, this can be used on its own as pure MCC to promote high thermal efficiency, particularly at part load, or it can be hybrided with the SIGE combustion management system. In the latter case this produces an engine which can combine both high power at full load and high thermal efficiency at part load. It can also be hybrided with the diesel combustion management system to produce an engine using diesel fuel with increased power density and a lower level of exhaust emissions in comparison with a conventional diesel engine.

The Merritt combustion system can greatly improve engine thermal efficiency when used in vehicles in urban driving in comparison with SIGE engines and produce less harmful exhaust emissions from motor vehicles. An example of the known Merritt engine is shown in FIG. 4 of the accompanying drawings, which is a partial cross section through a part of the engine, reproduced from GB-A-2246394. The engine is described briefly below and the reader is directed to GB-A-2246394 for a more detailed description.

In FIG. 4 the Merritt engine is illustrated in a construction which allows an operation of a hybrid Merritt/SIGE engine using spark triggered compression ignition (STCI).

The engine comprises a smaller piston 18 mounted on the crown 36 of the larger piston 16. The piston 18 includes a pillar 234 and a crown 35. It will be seen from FIG. 4 that the pillar 234 is curved in contour, the curve encouraging swirl of the air entering the combustion space 20 from the larger cylinder 12 and swirl of the fuel/air mixture following ingression (i.e. movement of the fuel/air mixture) into the combustion space 20. The combustion space is defined between pillar 234 and the wall 14a of the smaller cylinder 14. The shape and size of pillar are chosen to produce a suitable combustion volume of appropriate size and shape.

It will be noted that the crown 35 of the piston 18 has an edge with an axial thickness which is substantially less than the axial distance between the crowns 35 and 36 of the pistons 18 and 16. The crown 35 has a cylindrical peripheral edge 37 which is spaced slightly away from the wall 14a of the smaller cylinder to define inhibiting means in the form of an annular gap 128. The upper end of the smaller cylinder 14 as viewed in the drawing is formed with a peripheral groove 39 which provides a by-pass to promote ingression as described below. The upper end of the smaller cylinder 14 is provided with a second inlet valve 31 and a throttle valve 32. A fuel injector 34 is provided for delivering liquid fuel into the inlet duct 33. The throttle valve 32 controls the quantity of air flowing through inlet duct 33 and does so substantially independently of the quantity of the fuel delivered by the fuel injector 34. A second injector 82 is used for the SIGE mode and a throttle valve 83 operates together with a spark plug 52 also in the SIGE mode.

During the induction stroke of the engine in the Merritt mode of operation air enters the larger cylinder 12 through the inlet duct 25. Air also enters the smaller cylinder 14 through the open valve 31 along with fuel from the injector 34. The difference in pressure across the crown 35 of the piston 18 in the early part of the compression stroke can be influenced by the throttle valve 32 and the timing of the closure of valve 31. This in turn has an effect on the timing of ingression of the contents of the smaller cylinder 14 into the combustion space 20, near the inner dead centre position of the piston 18, towards the end of the compression stroke. Ingression timing can in turn control the timing of ignition of the vaporised fuel by compression ignition when the fuel/air mixture in cylinder 14 meets the hotter air delivered to the combustion space 20 by the larger piston 16 during the compression stroke.

The groove 39 has an axial length greater than the thickness of the edge 37 of the smaller piston crown 35 to provide an enlarged gap for the fuel/air mixture to ingress around the crown. The groove 39 also provides a clearance volume in the smaller cylinder 14 and this clearance volume can affect ingression timing by providing extra volume in cylinder 14 during the compression stroke.

The engine shown in FIG. 4 also has a throttle valve 83 in the inlet duct 25 which supplies air to the larger cylinder 12, and a spark plug 52. An exhaust valve and exhaust port are not shown in FIG. 4 but are nevertheless present in the engine in communication with the larger cylinder 12. The full line position of the pistons represents the outer dead centre position and the broken lines indicate the pistons at their inner dead centre position.

The "open" combustion space arrangement of FIG. 4 permits access by the spark plug 52 directly into the combustion space 20. The spark plug extends through the wall 14a of the smaller cylinder 14. The larger cylinder 12 can be provided with a flow control device such as a throttle valve 83 to reduce the air intake to the larger cylinder 12 during the induction stroke at part load in the SIGE mode.

After some of the fuel which has already started ingressing into the combustion space is ignited by a spark, the pressure and mean temperature of the gas in the combustion space rises. This results in the remainder of the vaporised fuel, which continues to ingress into the combustion space and mix with the air therein, being ignited by compression ignition even if the original flame started by the spark fails to traverse across the whole combustion space. This ignition process is referred to as spark triggered compression ignition (STCI).

An important advantage of using STCI is the ease with which it can be timed to meet variable engine conditions. When using STCI the precision of control required over the timing of the process of ingression can be less important and less critical to the operation of the engine.

To achieve STCI an engine system can operate with geometrical compression ratios which are insufficient to cause compression ignition during the early moments of ingression of the particular fuel chosen. Alternatively, throttle 83 may be used to adjust the end of compression pressures and temperatures. For example, in the case of gasoline the compression ratio may be lowered to a value of, e.g. 10:1 for spark triggered compression-ignition. However if compression ignition were to be used on its own with such a fuel a compression ratio value of, e.g. 18:1 may be needed. The second requirement is to position a spark plug in a place where it meets fuel vapour, whilst the fuel mixes with the air in the combustion space in the early part of the ingression process. The spark plug provides a spark at the correct time to initiate the STCI process.

Unlike the SIGE or diesel engine which can only use one ignition method, the Merritt engine can use either spark ignition or compression ignition methods depending on its design and the fuel used.

By vaporising at least part of the fuel prior to ingression the Merritt engine can use spark ignition, as described above. By segregating the fuel from most of the air during the compression stroke the Merritt engine can use the ignition process known as compression-ignition.

As a segregating engine, the Merritt engine is eminently suitable to use compression ignition to ignite suitable fuel. This is because fuel is not pre-mixed with enough air (i.e. the mixture is too rich) to ignite spontaneously during most of the compression process, even when high compression ratios are used. In a diesel engine, which is also a segregating engine, the timing of ignition is determined by the timing of the start of fuel injection into the combustion space. In the known Merritt engines the control of ignition timing is effected by controlling the timing of the start of the process of ingression or by controlling the timing of a spark to initiate STCI. In Merritt engines using high compression ratios and suitable fuel, ignition of fuel can take place without the aid of a spark the moment fuel vapour starts to enter the combustion space and meets with the very hot air therein. A segregating engine such as the Merritt engine can also be ignited by a catalyst, such as platinum, placed on the walls of the combustion chamber as described in some earlier Merritt engine patent specifications such as GB-A-2155546 and GB-A-2186913.

The choice of an ignition method also allows the choice of a wide range of fuels including gasoline and diesel fuel. The choice of fuel in combination with the compression ratio chosen may dictate the method of ignition used in the Merritt engine. For example, diesel fuel or very low octane gasoline can be ignited by compression-ignition when a high compression ratio is chosen, whereas high octane gasoline in combination with a lower compression ratio can be ignited by a spark. Spark ignition in the Merritt engine STCI process need not await the completion of the mixing process of all fuel and air since it need only ignite part of the fuel. In so doing it triggers the subsequent ignition of the remaining fuel by compression ignition as it ingresses into the combustion space.

Merritt engine technology known from GB-A-2246394 uses the method of hybriding with the SIGE to overcome the problem of meeting current exhaust emission legislation on NOX quantities. By adding a spark plug in the combustion chamber as well as an additional fuel injector or a carburettor and a throttle valve in the inlet manifold, the Merritt engine of FIG. 4 can be operated either (i) as a conventional spark ignited, stoichiometric gasoline engine which is compatible with the three way catalytic converter, at the higher BMEP range or (ii) as a pure Merritt engine at the middle to lower BMEP range with negligible NOX exhaust emission.

The STCI method is very attractive for the hybrid Merritt/SIGE engine since a spark plug is already present in the combustion chamber. The switch over between the SIGE and the Merritt modes of operation can be done automatically using an engine electronic management system, so that at high BMEPs or high engine loads the engine operates as a SIGE whereas at mid range and lower BMEPs it operates as a pure Merritt engine, without NOX emission, and with much improved thermal efficiency.

The previous explanations show that the combustion management system of the Merritt engine provides a link between the other two combustion systems in common use—the diesel engine and the SIGE. Like diesel, the Merritt engine is a segregating engine but like SIGE it allows the fuel to vaporise before it enters the combustion chamber. Like diesel it can use compression-ignition or like SIGE it can use spark triggered ignition but in combination with either high or low compression ratio values. It can use either gasoline or diesel fuel. Most importantly, it can operate with thermal efficiency values as high as or higher than those of the diesel engine, particularly at part load, but owing to its fast combustion process it can approach the power density levels of the SIGE more closely than the diesel engine can. Like the diesel engine it can use a turbocharged or other compressed air supply without a need to lower its geometrical compression ratio. It is a non-throttled engine but unlike the diesel engine it does not require a high pressure fuel injection system, since fuel enters the smaller cylinder of the Merritt engine during the low pressure part of the cycle before the compression stroke and the subsequent combustion process start.

The SIGE compression stroke operates on a pre-mixed fuel/air mixture and its spark ignition method can only ignite fuel/air mixtures of near stoichiometric proportions. The SIGE combustion process depends on a flame, initiated with a spark, moving across the whole fuel/air mixture volume in the combustion space. In contrast, the main advantages of a segregating engine over SIGE is its ability to burn fuel during the process of mixing it with air irrespective of the quantity of fuel involved. Thus, extremely lean overall fuel/air mixtures can be burnt. This capability of burning very lean overall fuel/air mixtures at mid to low BMEP ranges promotes lower gas temperatures during the expansion stroke. This in turn leads to improved engine thermal efficiency and lower quantities of harmful NOX gases in the exhaust, particularly at part loads. It is a recognised fact that the thermal efficiency of a reciprocating internal combustion engine rises as the fuel/air ratio becomes leaner.

The two main methods for increasing the thermal efficiency of reciprocating internal combustion engines are the promotion of very fast combustion at the start of the expansion stroke and the reduction of averaged gas temperatures following heat release. The latter applies When the engine operates below its maximum indicated mean effective pressure on the larger piston.

Segregating engines cannot match the high maximum values of mean effective pressure of the SIGE which is achieved by nearly full use of all the oxygen available in the cylinder in the combustion process. Segregating engines are unable to utilise air hidden in crevices and in parasitic volumes but Merritt engines which burn gasified fuel can do so better than diesel engines which burn fuel centred on liquid droplets.

Recent legislation concerning the control of exhaust emissions from vehicle engines has resulted in the use of the three way catalytic converter. This completes the process of oxidation of partially burnt fuel and also de-oxidises the harmful oxides of Nitrogen (NOX) formed during the combustion process. The catalytic converter currently available can only function efficiently with NOX reduction if the engine admits a stoichiometric air fuel mixture, since any excess oxygen present in the exhaust gas renders the catalytic converter ineffective when reducing NOX. Vehicles using SIGE now operate in this way within legislated limits on NOX. Vehicles using diesel engines currently cannot meet NOX reduction targets for SIGE for this reason and the pure Merritt engine is also likely to encounter a similar problem when operating at the higher range of Mean Effective Pressure (MEP). However, in the middle and lower range of MEP the Merritt engine can potentially operate whilst producing negligible amounts of NOX during the combustion process.

Lean burn SIGE's produce maximum quantities of NOX when operating with fuel/air mixtures just lean of stoichiometric, when combustion is hottest, e.g. at air/fuel ratios in the range of 16:1 to 20:1. As explained earlier, this NOX cannot be reduced by the three way catalytic converter since excess oxygen is present in the exhaust stream. However, when operating further in the lean range, e.g. with air fuel ratios greater than 20:1, at approximately 70% of engine BMEP and below, the dilution with excess air may be sufficient to cool the gases and to stop the formation of NOX during combustion.

Like the other segregating engine, the diesel engine, the Merritt engine needs to provide means for an effective mixing of fuel and air just prior to and during the combustion process. The Merritt engine can do so using arrangements similar to those of the diesel engine in its DI or IDI forms. In the Merritt engine the fuel enters the combustion chamber during the ingression process towards the end of the compression stroke, in at least a partially vaporised state. The parallel process in the diesel engine is called fuel injection.

The following terms when used herein in relation to the present invention have the following meanings:

Swept Volume Ratio—E

The ratio of the swept volume of the first volume in the smaller cylinder to the swept volume of the larger cylinder.

Compression to Ingression Volume Ratio—CIVR

CIVR—Larger Cylinder

The ratio of the maximum value of the spacial volume in the larger cylinder between the pistons to the value of the spacial volume between the pistons at the onset of ingression.

CIVR—Smaller Cylinder

The ratio of the maximum value of the first volume of the smaller cylinder to the value of the first volume at the onset of ingression.

Relative Compression to Ingression Volume Ratio

The ratio of the Compression to Ingression Volume Ratio of the larger cylinder to that of the smaller cylinder.

Ingression

The movement, influenced by the smaller piston, of fuel/air mixture from the first volume of the second cylinder into the combustion space which takes place at or towards the end of the compression stroke.

Segregation

The confinement, within the first volume of the smaller cylinder, of the fuel delivered to the first volume until ingression starts.

SUMMARY OF THE INVENTION

The present invention seeks to provide an improved internal combustion engine.

Accordingly, the present invention provides an internal combustion engine comprising:

at least one pair of first and second cylinders said first cylinder having a larger swept volume than said second cylinder;

respective first and second pistons reciprocable in said cylinders, wherein said second piston has a drive stem and divides said second cylinder into a first volume containing said drive stem of said second piston and a second volume between said two pistons;

air inlet means communicating with said first cylinder;

exhaust means communicating with said first cylinder;

means defining a common combustion space between said pistons when said pistons are substantially at their inner dead centre positions, said combustion space comprising said second volume;

transfer means for enabling gas flow between said first and second volumes towards the end of the compression stroke;

inhibiting means for inhibiting movement of fuel/air mixture from said first volume into said second volume until towards the end of the compression stroke of said second piston;

a first fuel source for providing fuel to said first volume;

and drive means for driving said second piston, said drive means including means for maintaining said second piston substantially stationary at or adjacent its inner dead centre position during at least a portion of the expansion stroke of said first piston.

One of the noteworthy advantages of the present invention in all its forms is that both diesel and SIGE engines can be converted according to this principle by changing the design of only the cylinder head leaving the crankcase and transmission assembly unaffected.

When operating the engine construction shown in FIG. 4 in the SIGE mode the pillar 234 of the smaller piston 16 may require effective cooling to keep its temperature down so as to stop pre-ignition of the pre-mixed air and fuel which enter the engine through inlet valve 24. In the SIGE mode such cooling can be provided by spraying an oil jet from the gudgeon pin into an internal cavity in the pillar but the problem of pre-ignition in the SIGE mode of operation may be solved with a construction of an engine according to the present invention. The construction according to the present invention also has other advantages. For instance when hybriding the Merritt engine principle with a diesel engine as described in GB-2246394, the removal of the pillar 234 allows easier distribution of fuel spray from the diesel fuel injector into the combustion space 20.

BRIEF DESCRIPTION OF THE DRAWINGS

The present invention is further described hereinafter, by way of example, with reference to the accompanying drawings, in which:

FIG. 9 is a view in detail of the smaller cylinder and piston of the engine of FIGS. 5 and 6 just prior to ingression;

FIG. 10 is a view similar to that of FIG. 9 during ingression;

FIG. 11 is a view similar to that of FIG. 5 of a second, Indirect Ingression embodiment of a Merritt engine according to the present invention, shown at the end of the induction stroke;

FIG. 14 is a view similar to that of FIG. 9 illustrating a modified arrangement having a spark plug, lower groove and restriction orifice for an Indirect Ingression embodiment;

FIG. 15 is a view similar to that of FIG. 5 showing a fourth, Direct Ingression embodiment of an engine according to the present invention, in the form of a hybrid spark ignition lean burn torching arrangement;

DETAILED DESCRIPTION OF THE DRAWINGS

Figure 1:
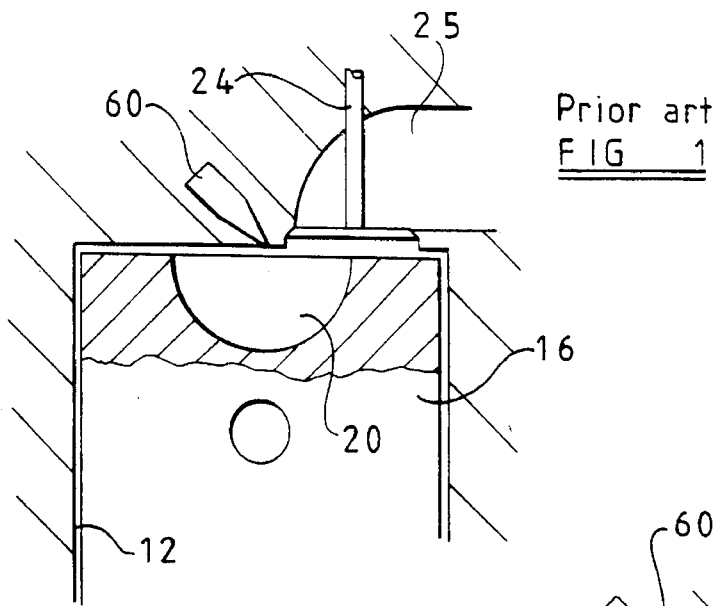
FIG. 1 is a partial section through part of a known form of direct injection (DI) diesel engine.
Figure 2:
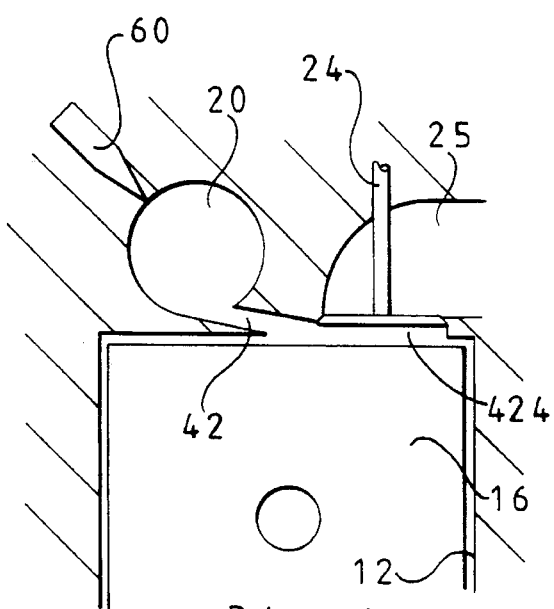
FIG. 2 is a partial section through part of a known form of indirect injection (IDI) diesel engine.
Figure 3:
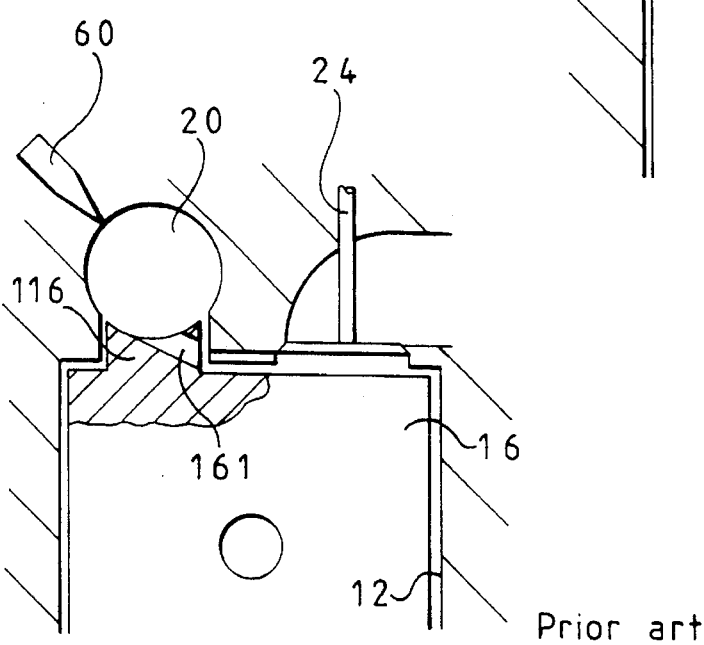
FIG. 3 is a partial section through part of a known form of intermediate injection (INI) diesel engine.
Figure 4:
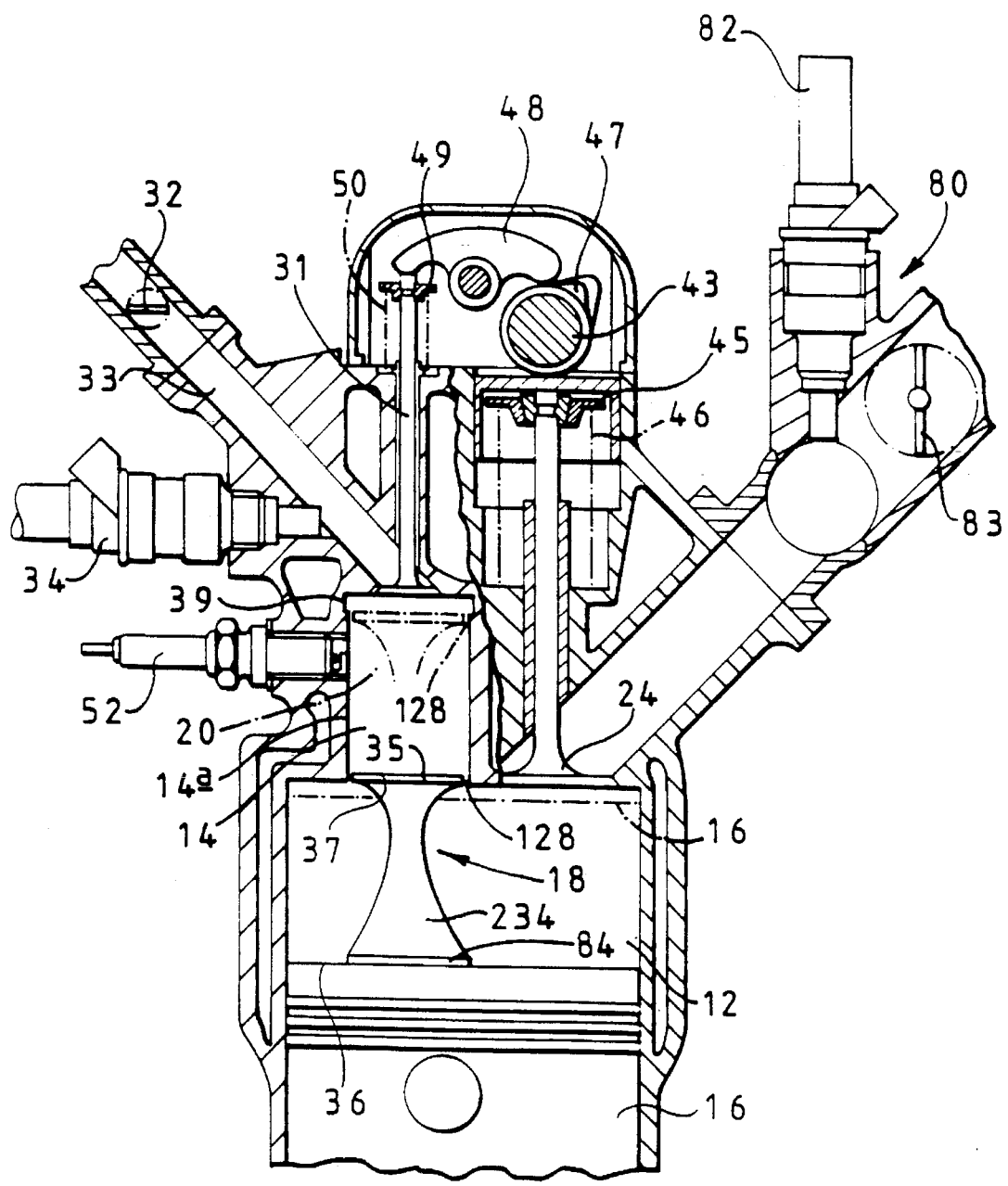
FIG. 4 is a partial section through a known Merritt engine, in SIGE hybrid form.

The Merritt engine can be constructed in three arrangements similar to the diesel engine:

1. The Direct Ingression (DI) Merritt engine
2. The Indirect Ingression (IDI) Merritt engine
3. The Intermediate Ingression, or piston plugged Indirect Ingression (INI) Merritt engine In the DI Merritt engine, an example of which is shown in FIGS. 5 and 6, the aperture between the larger cylinder 12 and the combustion space 20 is largest and can be the full bore of the smaller cylinder 14.

In the IDI Merritt engine, an example of which is shown in FIG. 11, the aperture 2161 can be made relatively small to promote a suitable swirl motion in the air delivered to the combustion chamber during the compression stroke of the larger piston, as well as a powerful jet of hot gases during the early part of the expansion stroke, in a similar manner to the IDI diesel engine's method.

Figure 12:
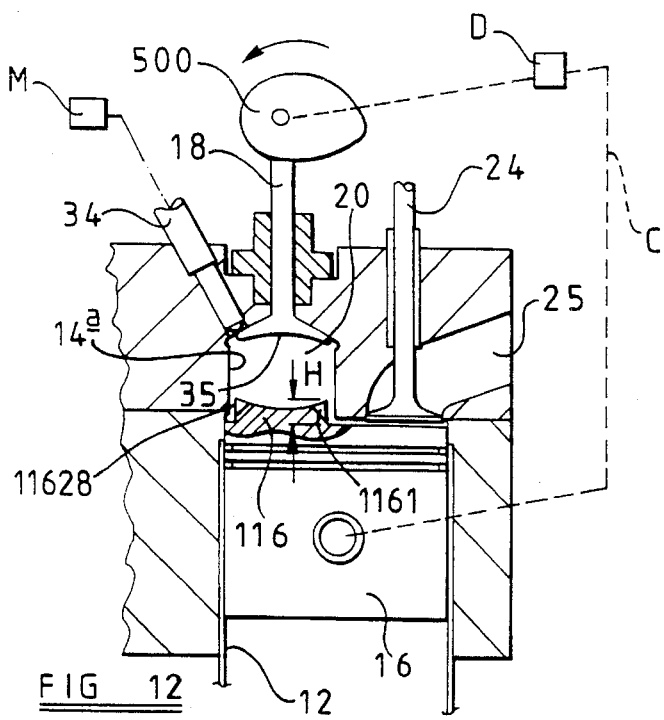
FIG. 12 is a view similar to that of FIG. 5 of a third, Intermediate Ingression embodiment of an engine according to the present invention, shown at the end of the compression stroke.

In the INI Merritt engine, an example of which is shown in FIG. 12, the larger piston is provided with a protrusion 116 which partially plugs the aperture during the latter part of the compression stroke and the early part of the expansion stroke.

Figure 5:
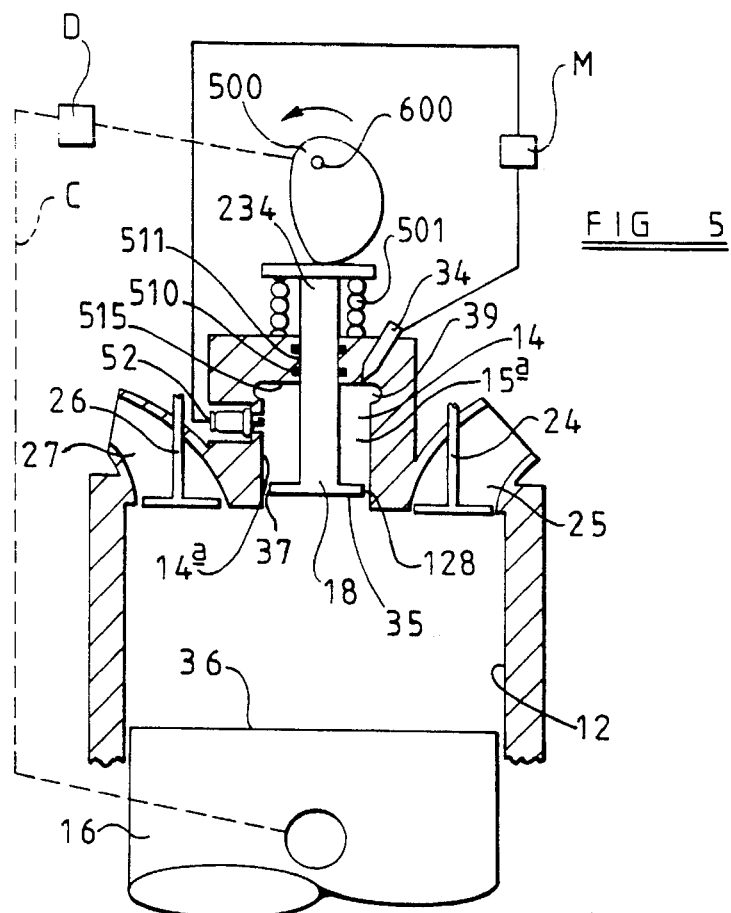
FIG. 5 is a partial section through part of a first, Direct Ingression embodiment of Merritt engine according to the present invention, shown at the end of the induction stroke.
Figure 6:
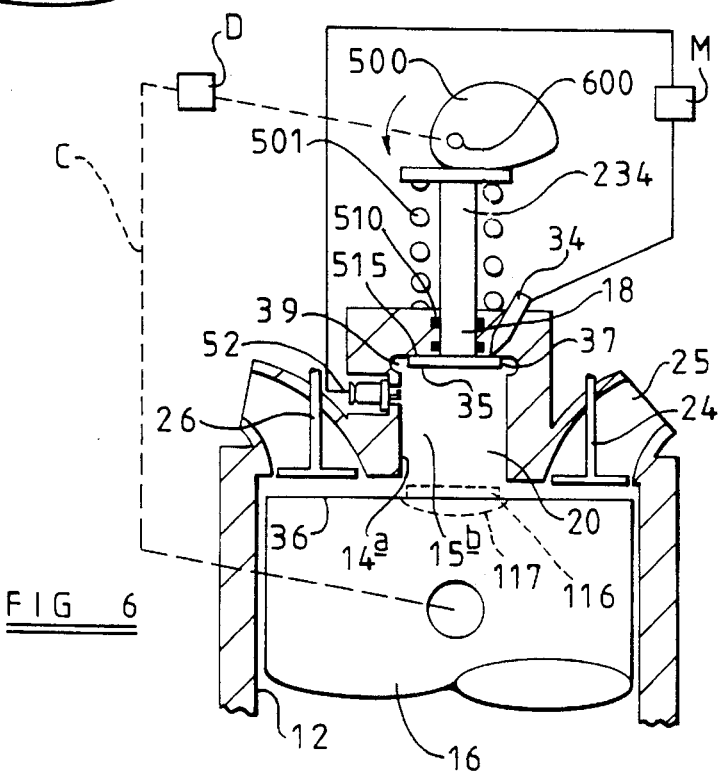
FIG. 6 is a view of the engine of FIG. 5 at the end of the compression stroke.

The Merritt DI engine of FIGS. 5 to 7 has a larger cylinder 12 and a smaller cylinder 14 Which is an axial extension of the larger cylinder. A smaller piston 18 is movable in the smaller cylinder 14 and has a crown 35 and a cylindrical drive stem 234. A larger piston 16 is movable in the larger cylinder 12, has a crown 36 and is sealed with the aid of piston rings in the conventional way. The two pistons are moved by separate mechanisms which may be geared or coupled together or are controlled to operate together by a suitable mechanism C. For example, the larger piston may be moved by a crankshaft and connecting rod arrangement and the smaller piston by a cam 500 attached to a camshaft 600. The stroke distance of the two pistons may be different. Preferably the larger piston has a longer stroke.

Figure 7A:
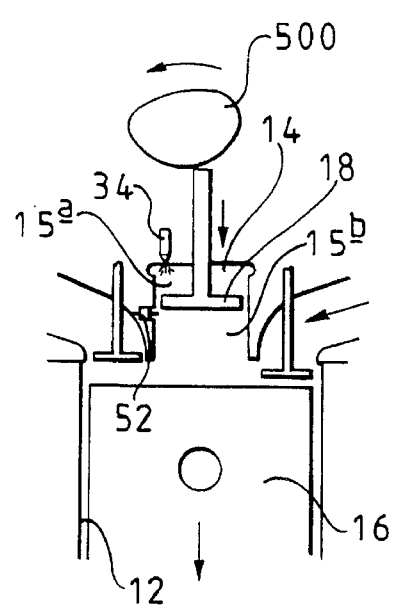
FIGS. 7a, 7b, 7c and 7d show one complete cycle of the operation of the engine of FIGS. 5 and 6.

The smaller piston 18 divides the second cylinder 14 into a first volume 15a behind the crown 35 of the smaller piston, containing the drive stem 234 and a second volume 15b situated between the two pistons (FIG. 7a). It will be appreciated that these volumes vary with the movement of the piston 18, and first volume 15a has its smallest values when second piston 18 is at its inner dead centre position (FIGS. 6 and 7d) and changes its direction of movement.

The swept volume contained in the smaller cylinder is the space bounded by the cylinder wall 14a, the rear surface of the crown 35 of the smaller piston 18 and the surface of the stem 234 of the smaller piston 18. This is best seen in FIG. 5 where the swept volume of the smaller cylinder is of maximum value when the smaller piston is at its outer dead centre position. FIG. 6 shows the engine near the end of the compression stroke when both the larger piston and the smaller piston approach their inner dead centre positions, where both pistons 16 and 18 expose the smallest volumes of their respective cylinders 12 and 14. The space bounded by wall 14a now becomes the combustion space 20.

The crown 35 of the smaller piston 18 has an edge 37 with an axial thickness which is substantially less than the stroke of the piston 18. The crown 35 is shown to have a cylindrical peripheral edge 37 which is spaced slightly away from the wall 14a of the smaller cylinder to form an annular gap 128. The upper end of the smaller cylinder 14 as viewed in the drawing is formed with an optional peripheral groove 39 which provides a by-pass to promote ingression as described below and also allows a clearance volume in the smaller cylinder.

The crown 35 of the smaller piston 18 is shown in simplified shape in FIGS. 5 and 6. It can be designed in a variety of shapes and some are described below.

The smaller piston 18 is guided by and slides in bore 511 in the cylinder head of the engine. The bore provides a small clearance around the stem 234 to allow it to move freely but also to provide a seal against excessive gas escape. One or more sliding sealing rings 510 can be positioned in series to seal stem 234 and reduce gas leakage even further. The small piston moves under the influence of cam 500 which rotates at half the speed of the crankshaft. Spring 501 helps piston 18 to remain in contact with the cam. The cam 500 is synchronised with the crankshaft mechanism of the large piston 16 to ensure that, when piston 16 reaches its inner dead centre position at the end of the compression stroke (FIG. 6) the smaller piston 18 also arrives substantially at its inner dead centre position, as shown. When in the inner dead centre position the undersurface of the crown 35 of the smaller piston 18 can seal against a seal face 515 substantially to prevent gas leakage through bore 511 and around stem 234.

The profile of cam 500 provides an extended induction stroke for the smaller piston.

The movement of the smaller piston differs from that of the larger piston not only in the length of the stroke. For example, the induction stroke of the smaller piston may extend over the exhaust stroke as well as the induction stroke of the larger piston. Also, the beginning and/or end of the strokes of the two pistons need not take place at precisely the same moment.

Figure 26:
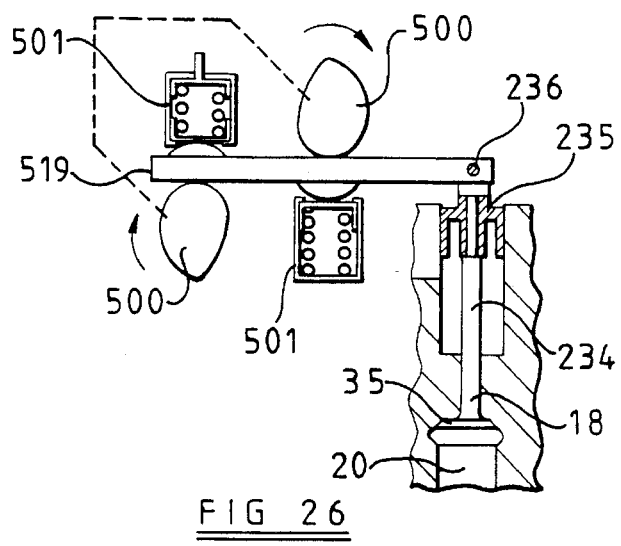
FIG. 26 is a partial section through a double cam mechanism which can be used to move the smaller piston of the engine over relatively long stroke distances using relatively small cam lifts.

It will be appreciated that the mechanism driving the smaller piston can be different from the camshaft shown. For example, it can be a cam operated rocker or a beam operated by two cams as shown in FIG. 26. Alternatively it can be achieved with the use of hydraulic or pneumatic actuation systems, which are controlled by signals from the crankshaft of the larger piston. If such a control malfunctions the erratic movement of the smaller piston cannot damage the larger piston by unwanted contact.

Fuel in liquid form is delivered into the smaller cylinder 14 by a fuel entry valve such as an injector 34 during the induction stroke and/or compression stroke of the smaller piston. The fuel injector clan therefore be designed for relatively low pressure deliver and can take advantage of the shielding provided by the crown 35 of the smaller piston when seated against face 515 during the combustion period and the expansion stroke of the larger piston. The liquid fuel may be atomised with some air.

Fuel in gaseous form may also be admitted to cylinder 14 through a small valve mechanism (not shown in the drawings) which may be actuated mechanically or electrically and may deliver fuel mixed with some air.

As an Alternative to a fuel injector, the movement of the smaller piston 18 may be used to pump fuel through its stem 234 and inject it into cylinder 14 through an aperture in or near the undersurface of the crown 35. In such an arrangement (not shown in the drawings) injector 34 and its fuel pump may be incorporated into the design of the smaller piston.

The larger cylinder has an exhaust valve 26 and an inlet duct 25 provided with an inlet valve 24 for admitting substantially unthrottled air into the larger cylinder 12.

The combustion space may be provided with a spark plug 52 to allow it to operate on the STCI principle. In such a case, the compression ratio of the engine can be lowered since the ignition of the rich mixture (containing vaporised fuel) after it ingresses through the groove 39 and the gap 128 at the end of the compression stroke, is first caused by a spark occurring slightly before the moment illustrated in FIG. 6. Following the spark, the early combustion raises the temperature and pressure of the gases in combustion space 20 so that the remaining fuel which continues to ingress through gap 128 and groove 39 is now ignited by compression-ignition.

The combustion space volume 20 shown in FIG. 6 is preferably contained within the space provided for cylinder 14 in the cylinder head but can be extended into the larger cylinder 12, for example into a depression 117 shown in a broken line in the crown of the larger piston 16. Alternatively, the combustion volume 20 can be reduced by using a protrusion 116 shown also in broken line, on the crown 36 of the larger piston 16.

Either or both pistons 16 and 18 may have protrusions or depressions such as 116 or 117 which may help to direct gas movement in the combustion space and also allow the adjustment of the volume of the combustion space to give a desired compression ratio to the engine. If the volume chosen within the smaller cylinder 14 is insufficient to provide the clearance volume required in the combustion space, for a given compression ratio, further combustion clearance volume may be provided either by the cavity 117 in the crown of the larger piston or by a recess in the cylinder head which may incorporate the valve seat cavities.

The volume of the smaller cylinder 14 may be either smaller or larger than the volume of the combustion space 20. A pure Merritt engine requires all the fuel supply to the engine to be delivered to the smaller cylinder 14 and such an arrangement may benefit from larger swept volumes for the smaller cylinder or a larger swept volume ratio E. A Merritt engine in hybrid form may use lower values for E. For example, the smaller cylinder may be miniaturised to receive only a small fraction of the fuel supplied to the engine. The remainder of the fuel can be supplied either directly to the combustion space, as in the Merritt/diesel hybrid mode, or to the inlet duct 25 of the larger cylinder, as in the Merritt/SIGE hybrid mode. In this way the smaller cylinder provides an ignition amplifier which can greatly increase the energy available for ignition of the main fuel charge. Such applications can improve the combustion process in diesel engines or allow the ignition of lean pre-mixed air/fuel mixtures in SIGE engines.

The cam profile 500 moves the smaller piston 18 from inner dead centre to outer dead centre positions over 180° of cam rotation or 360° of crank rotation. This provides for an extended induction stroke for the smaller piston which takes place concurrently during both the exhaust stroke and the inlet stroke of the larger piston 16. The compression stroke of the smaller piston can take place over 90° of cam rotation and during the last 90° of cam rotation the smaller piston remains parked in its inner dead centre position.

Figure 7B:
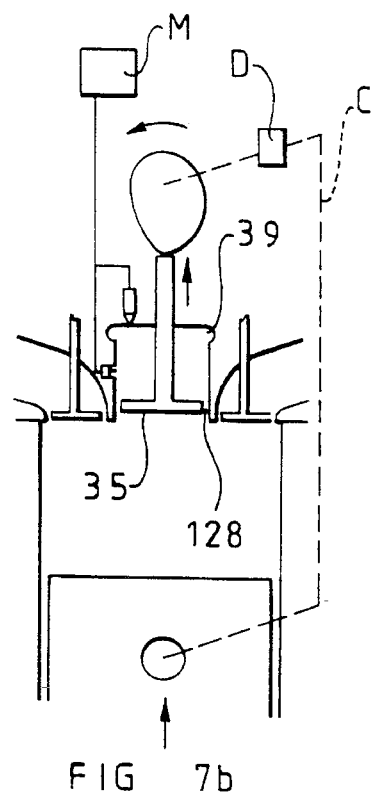
Figure 7C:
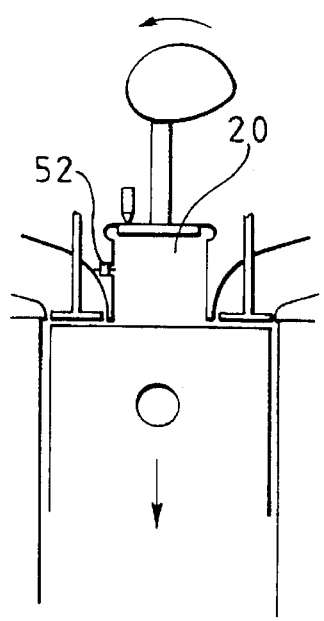
Figure 7D:
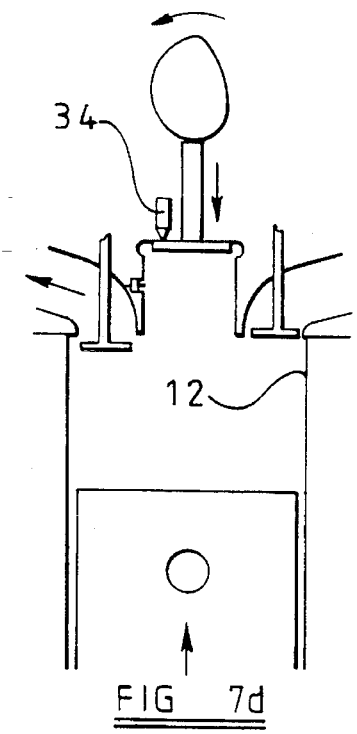

FIGS. 7a to 7d diagrammatically show the operation of the engine of FIGS. 5 to 7 in puke Merritt mode in a four stroke cycle. FIGS. 7a to 7d represent the induction, compression, expansion and exhaust stroke for the larger piston 16. FIGS. 7d and 7a represent the induction stroke for the smaller piston 18, FIG. 7b represents the beginning of the compression stroke for both pistons and FIG. 7c represents a stationary or parking period for the smaller piston.

The timing arrangement illustrated in FIGS. 7a to 7d allows the smaller piston 18 to start its induction stroke—moving away from its inner dead centre position—when the larger piston 16 starts its exhaust stroke by moving away from its outer dead centre position (FIG. 7d). In this way, the velocity of the smaller piston 28 is slowed down in comparison with the larger piston 16 so that it only reaches approximately half its induction stroke distance at the point where the larger piston 16 reaches the inner dead centre position at the end of its exhaust stroke (FIG. 7a). The smaller piston 18 then continues its induction stroke away from its inner dead centre position whilst the larger piston 16 also moves away from its inner dead centre position during its induction stroke. Following the induction strokes, both the larger piston 16 and the smaller piston 18 can start their compression strokes approximately at the same time (FIG. 7b). Finally, the smaller piston 18 remains stationary at its inner dead centre position when the larger piston undergoes its expansion stroke (FIG. 7c). In this arrangement the first part of the induction stroke of the smaller piston takes place during the exhaust stroke of the larger piston and the second part during the induction stroke of the larger piston.

An important advantage of such an arrangement is to give the camshaft a long angular arc during lift, which can be as large as 180 cam degrees. This allows the use of relatively large cam lifts without excessive mechanical stresses. The main benefit of extending the duration of the induction stroke of the smaller piston 18 is to allow additional time for fuel vaporisation in the smaller cylinder second volume.

The injector 34 can start delivery of fuel at the beginning of the induction stroke for the smaller piston 18 (FIG. 7d) and delivery can continue during thee whole of its induction stroke and even during its compression stroke. Preferably, fuel injection should start as early as possible at the beginning of the induction stroke of the smaller piston, to maximise the time period available for vaporising the liquid fuel within the smaller cylinder 14. During the early part of the induction stroke of the smaller piston, exhaust gases in the larger cylinder 12 enter the first volume 15a through the gap 128 around the crown of the smaller piston. The hot gases assist the vaporisation of the fuel injected by injector 34.

The smaller cylinder 14 is not provided with either inlet or exhaust valves and during the latter part of the induction stroke of the smaller piston 18 fresh air in the larger cylinder flows through gap 128 to mix with the contents of the smaller cylinder. An optional lower groove 391 (FIG. 14) can be used to increase the quantity of air transferred into the smaller cylinder by enlarging the peripheral gap around the crown 35 of the smaller piston, when this piston reaches the end of its induction stroke at its outer dead centre position. In one optional arrangement suitable for a Direct Ingression or an Intermediate Ingression embodiment the crown of the smaller piston 35 may exit the bore of the smaller cylinder 14 at the end of the induction stroke to assist in further induction of air from the larger cylinder into the smaller cylinder.

The size of the gap 128 can be designed deliberately to restrict the pressure in the smaller cylinder to a value below the pressure in the larger cylinder during the induction stroke of the smaller piston. The gap may be designed to suit engine speed range, fuel used, swept volume ratio E and other parameters. Where the upper groove 39 is used the gap can even be very small, approaching a near contact, sliding clearance, to prevent ingression until the edge of the piston 18 reaches the groove 39. The groove 39 can be omitted but in this case the gap 128 must be made large enough to allow the fuel to flow through the gap into the combustion space 20 during ingression.

As the size of the first volume 15a of cylinder 14 increases during the induction stroke the transfer of gases into the first volume of cylinder 14 from cylinder 12 is affected by the increase in pressure in cylinder 14 due to the vaporisation of the fuel.

Once the first volume of cylinder 14 starts to decrease during the compression stroke (FIG. 7b) segregation is maintained until towards the end of the compression stroke of the smaller piston 18.

When segregation is finally ended the mixture of gases inside the first volume 15a of the smaller cylinder 14 is forced into the combustion space 20 in an ingression process. The mixture contains vaporised fuel, some air and some exhaust gases and possibly some fuel still in liquid form, but with insufficient oxygen to promote burning by compression ignition.

During this ingression process the underside of the small piston crown moves rapidly towards the end face of the smaller cylinder 14. This is shown more clearly in FIGS. 9 and 10. FIG. 9 shows the smaller piston in a preferred form near the end of the compression stroke just before the start of ingression. At this point segregation still prevails and air is shown moving from combustion space 20 into the first volume 15a through the gap 128.

Figure 22:
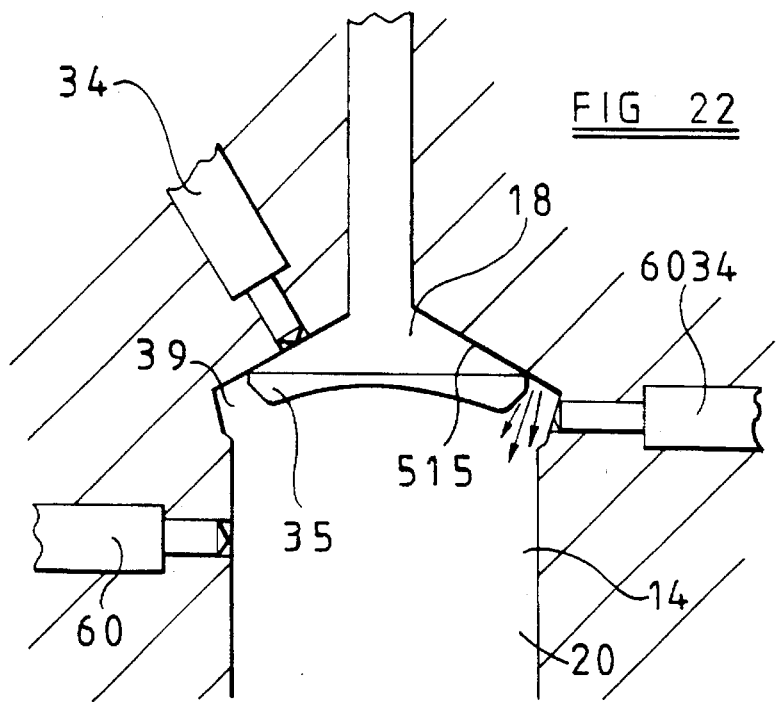
FIG. 22 is a view similar to that of FIG. 9 illustrating possible positions for fuel injectors.

In FIG. 10 the edge 37 of the piston crown 35 has uncovered groove 39 and by the sudden removal of the clearance volume from the smaller cylinder 14 and the concurrent enlargement of gap 128, the contents of the first volume ingress into the combustion space 20 as shown by the arrows. The profile of cam 500 can be designed to allow the smaller piston 18 to reach its seat 515 with some velocity. In this way the gases are made to ingress with appreciable force. The ingressed fuel/air mixture can be directed into the combustion space in a particular manner by the shape of the groove and it will be appreciated that some variations of this shape are possible. One variation is shown in FIG. 22 where both the profile of the groove and the crown 35 of the smaller piston are shaped to provide a diverging passage for the ingressing fuel/air mixture as illustrated by the arrows in FIG. 22.

Fuel entering the combustion space mixes with further oxygen and ignites either by compression ignition or by spark ignition using spark plug 52. However, all the fuel will not burn completely until the process of ingression is completed and the smaller piston is seated on seat 515 as shown in FIG. 22.

Any leakage of gas through the stem seal 510 during the compression stroke or the ingression period, can be collected in a small manifold 5100, from where it can be delivered through a passage 5101 to the air inlet duct 25 of the larger cylinder 12.

During the expansion stroke of the larger piston 16 the smaller piston is parked and so protects the stem seal 510 and the fuel injector 34 from the high pressure and temperature conditions. The smaller piston crown 35 is heated up during the combustion period and this assists vaporisation of fuel in the next engine cycle.

Parking the smaller piston during most of the combustion period and during the expansion stroke leaves the combustion space 20 free of the crown 35 of the smaller piston. This promotes an improved combustion process.

The exhaust phase (FIG. 7d) of the larger piston 16 coincides with the start of the induction stroke of the smaller piston 18, and the injection of fuel into the first volume can start during this stroke.

The start and finish of the movements of the smaller piston 18 between its outer and inner dead centre positions, may or may not coincide exactly, in timing, with the start and finish of the movements of the larger piston 16 between its outer and inner dead centre positions. It is desirable to time the moment of ingression, when the smaller piston 18 approaches its inner dead centre position or just begins to uncover groove 39, if provided, to promote the moment of ignition at the optimum crank position when the larger piston 16 approaches its inner dead centre position. The ignition may start as a result of a spark generated in the spark plug 52, or by compression ignition if the combination of fuel used and the compression ratio of the engine are chosen to allow compression ignition.

The stroke of the smaller piston 18 is smaller than the stroke of the larger piston 16, preferably considerably smaller.

A second suitable timing arrangement uses the cam 506 of FIG. 25. The induction strokes of both the small and large pistons are started at approximately the same crankangle position and the compression strokes of both pistons are finished also at approximately the same crankangle position. Thereafter, the larger piston 14 continues with its expansion stroke followed by its exhaust stroke whilst the smaller piston 18 remains stationary during both strokes, having parked at its inner dead position reached at the end of the compression stroke. Other timing arrangements for piston movement are possible.

The movements of the two pistons (shown in FIG. 7) need not be synchronised exactly. Preferably the smaller piston should remain seated on its seal face for most of the expansion stroke of the larger piston 16. It can then start its induction stroke either near the end of the expansion stroke of the larger piston 16, or at the beginning or during the exhaust stroke of the larger piston. Alternatively, it may start its induction stroke at any time during the exhaust stroke of the larger piston 16. If the smaller piston starts its induction stroke during the exhaust stroke of the larger piston it will induce some hot gaseous products of combustion into the first volume of the smaller cylinder 14. When the fuel is injected into it during the induction stroke the hot gases will assist vaporisation of the fuel.

Figure 13A:
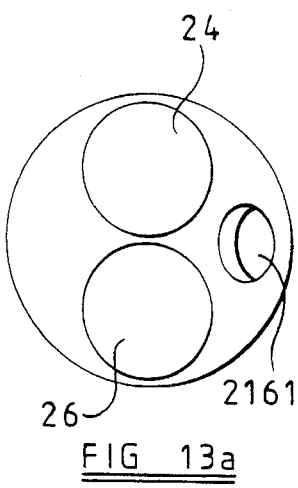
FIGS. 13a, 13b, 13c and 13d are plan views of four forms of flame plate apertures for the cylinder head of engines according to the present invention.
Figure 21:
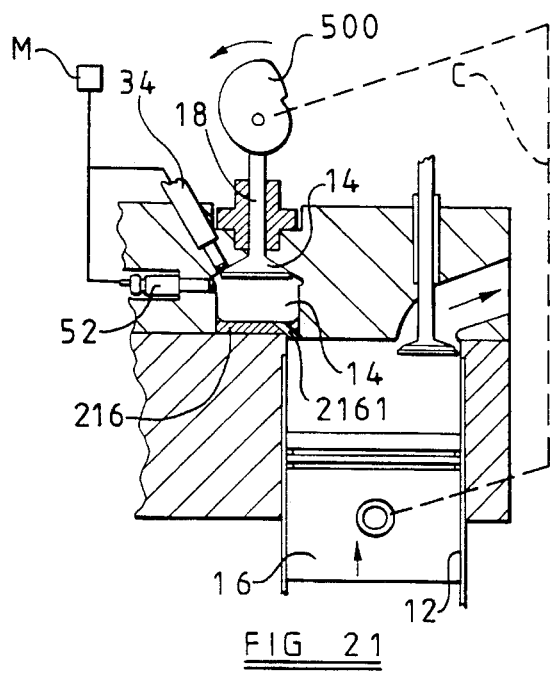
FIG. 21 is a view of a modified form of the engine of FIG. 11 at the start of the exhaust stroke for the larger piston, which is suitable for use with gasoline fuel, using STCI.

In the Merritt Indirect Ingression arrangements shown in FIGS. 11, 14 and 21, the combustion space 20 is partially separated from the larger cylinder 12 by a restriction or plate 216 which has an aperture 161. The aperture allows the movement of gases between the combustion space 20 and the larger cylinder 12 and serves a number of functions. It promotes swirl motion in the air moving from the larger cylinder 12 to the combustion space 20 during the compression stroke of the larger piston 16. It also promotes an outflow of hot gases from the combustion space during the early stages of combustion, in a form of a high velocity jet. This jet can be directed towards valve cavities in cylinder 12 which contain unused or parasitic air which can be made to participate in the combustion process. The size of aperture 2161 can vary according to the designer's choice, depending on the fuel and the compression ratio used. The Indirect Ingression mixing arrangement can be used in Merritt engines using gasoline or diesel fuel or indeed any other fuel with either compression-ignition or STCI. An obvious advantage for the Indirect Ingression Merritt engine is the reduced demand of space for aperture 2161 on the engine flame plate. This allows less interference with valve space as can be seen in FIGS. 11 and 13a. The combustion space volume may be contained between plate 216 and the smaller piston crown 35 or it may be extended partially into the larger cylinder, for example in a depression 117 in the larger piston 16 as shown in FIG. 11.

In the Merritt Intermediate Ingression engine arrangement of FIG. 12, the area of the combustion space 20 which opens towards cylinder 12 is temporarily blocked by a solid boundary 116. This boundary contains an aperture or apertures 1161 which performs a similar function to aperture 2161 of FIG. 11. The aperture is capable of directing the air from cylinder 12 into the combustion space 20 with a tangential and/or axial velocity component. This promotes rotational gas movement in the air delivered to the combustion space 20 during the latter part of the compression stroke.

The solid boundary can be in the shape of a plug 116 formed as a protrusion on piston 16. The plug 116 can have a generous clearance from the wall of the smaller cylinder 14 containing the combustion space 20, to avoid contact during movement of the piston. The effective height H of the plug 116 above the crown of the large piston 16 can be relatively small, for example in the range 10% to 20% of the stroke of the larger piston 16. This is because a large proportion (for example 50% to 70%) of the mass of the air in the cylinder 12 is transferred past the plug into the combustion space 20 during the last 10% to 20% of the movement of the larger piston, towards the end of the compression stroke. Moreover, this air has an increased density as it is in a highly compressed state.

As can be seen in FIG. 12 the plug 116 and the piston 18 have part-spherically shaped surfaces, which help to promote the swirling motion of the air in the combustion chamber 20.

FIGS. 13a to 13d are plan views of four possible forms of engine flame plate. The flame plate contains the valve head seats 24 and 26 and the Figures show possible shapes for the opening between the larger cylinder 12 and the smaller cylinder 14. The arrangement in FIGS. 13d and 13c allows for four valves per cylinder. Two inlet valves 24 and two exhaust valves 26 surround a fully open, centrally positioned smaller cylinder 14 in a Direct Ingression engine. The cross section of the smaller cylinder can be circular or it can be of another suitable shape such as in FIG. 13c to make best use of the area available on the flame plate. The positive guidance of the stem 234 of the smaller piston 18 ensures that the crown 35 can be of any cross-sectional shape without the danger of it touching the wall 14a of the smaller cylinder. The four-valve arrangement is symmetrical and conducive to good gas flow. FIG. 13a shows an example of a two-valve arrangement in an Indirect Ingression engine. Here the combustion space communicates with the larger cylinder 12 through aperture 2161 (see also FIG. 11).

Figure 13B:
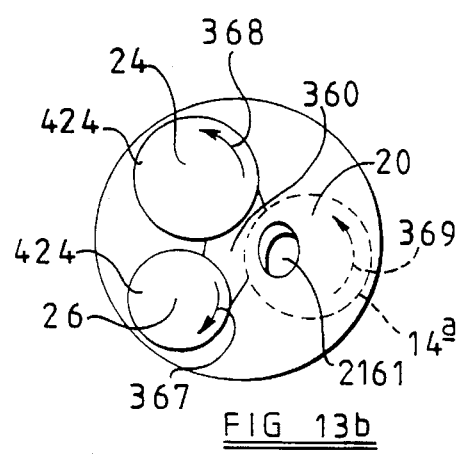

FIG. 13b shows the valve cavities 424 of the inlet valve 24 and the exhaust valve 26, and an end view of the combustion space 20 in an Indirect Ingression engine. Shallow passages 360 are cut into the cylinder head or alternatively can be cut in the larger piston crown to direct gases to and from the aperture 2161. Arrow 369 shows the direction of rotation of the air squished into the combustion space during the latter part of the compression stroke Whilst arrows 367 and 368 show the direction of rotation of the burning gases when emerging from passages 360 into the valise cavities. In this way the oxygen trapped in the parasitic volumes of the valve cavities can be entrained into the combustion process in a similar way to the operation of an IDI diesel engine, using the Ricardo Comet arrangement.

The Segregation process in the Merritt Engine

In an engine according to the present invention segregation is the process of keeping the fuel/air mixture in the first volume 15a of the smaller cylinder 14 separate from the air admitted to the larger cylinder 12. The process relies on the pressure prevailing in the first volume being lower or equal to the pressure in the second volume 15b during the induction stroke and most of the compression stroke of the smaller piston 18. This segregation is achieved by using one or more of several features.

1. The gap 128 between the walls of the smaller cylinder and the crown of the smaller piston when it is large enough to allow gas flow through the gap under selected conditions.

2. The gap 128 between the wall is of the smaller cylinder and the crown of the smaller piston when it is too small to allow gas flow through the gap.

3. The upper groove 39, the volume of which gives the smaller cylinder its clearance volume.

4. The Relative Compression to Ingression Volume Ratio.

5. The displacement crank-angle relationship for the smaller piston 18 relative to the larger piston 12, particularly during the compression stroke. This determines the rate of volume reduction in the smaller cylinder 14 and the larger cylinder 12 during the most of the compression strokes of the two pistons.

Use of the above features, in a selected combination or separately, depending on the design of the engine, inhibits ingression until towards the end of the compression stroke of the smaller piston 18. For example, use of Feature 2 will also require use of Feature 3. Use of Feature 1, however, may require the smaller piston to lag more behind the larger piston (Feature 5).

Features 2 and 3 are used, for example, in FIG. 9 which shows gas transfer across the crown 35 of the smaller piston 18 through the gap 128. During the induction stroke of the smaller piston, as the first volume 15a of cylinder 14 increases, fuel is delivered into the first volume by, for example, injector 34. As the fuel vaporises it produces additional partial pressure in the first volume and if the pressure remains lower than the pressure in the larger cylinder 12, during the exhaust stroke of the larger piston, some of the gases in the large cylinder move across gap 128 to mix with the fuel. The restriction imposed by the size of the gap can promote a pressure drop which keeps the pressure in the first volume 15a below the pressure in the larger cylinder and this effect can increase with engine speed.

To ensure complete segregation during the induction stroke of the smaller piston, the quantity of fuel delivered to the first volume 15a in the smaller cylinder 14 needs to be matched to the swept volume of the smaller cylinder to ensure that the total pressure in the first volume is kept lower than that in the larger cylinder during its induction stroke. More volatile fuels, such as gasoline, may need a larger swept volume for the smaller cylinder 14 compared with less volatile fuels which may not fully vaporise in the smaller cylinder before the ingression process begins. Less volatile fuels can still be used in the Merritt engine since the ingression process can provide a powerful ejection of gases, as shown in FIG. 10, and this gas can carry with it some unvaporised fuel in fine liquid droplet form which can be burnt rapidly in the combustion space. For example, a pure Merritt engine can use diesel fuel injected by a low pressure injector 34 into the first volume in the smaller cylinder 14 and still operate even without full vaporisation of all the fuel quantity, particularly at full load. In such an event only part of the fuel vaporises during the induction and compression strokes of the smaller piston and the remaining liquid fuel is atomised when ejected with the hot gases during the ingression process.

The volume contained within groove 39 also provides a clearance volume for the smaller cylinder 14 until the piston crown 35 reaches the groove, towards the end of the compression stroke. The clearance volume, for example in the upper groove 39, of the smaller cylinder can be chosen to ensure that the volume ratio (hence pressure ratio) across each consecutive displacement step of the piston 18 during its compression stroke, is smaller for the smaller cylinder 14 than the corresponding volume ratio in the larger cylinder 12 over the same displacement time interval. In this way the pressure rise in the first volume of the smaller cylinder 14 is less than the pressure rise in the larger cylinder 12 even if both cylinders start a compression step with equal pressures. In this way segregation is maintained during the compression strokes of both pistons until the smaller piston reaches the groove 39. Then, the sudden loss of this clearance volume, which occurs at the moment when the gap 128 is suddenly enlarged, causes the process of ingression to start.

Feature 5 can be explained with reference to FIGS. 8a and 8b. The positions of the two pistons 16, 18 as they move along their compression strokes from outer dead centre position (ODC) to inner dead centre position (IDC), is plotted against the crank angle of the engine from 180° to 360°. The position of each piston is expressed as a percentage of the stroke length for the piston. Curve 6000 shows a typical near sinusoidal movement of a crank mechanism for the larger piston and curves 6001 and 6002 are two examples showing the movement imparted to the smaller piston by a cam profile with the camshaft set at two phase angles relative to the crankshaft. Points 6003 and 6004 represent the start of the ingression process where the edge 37 of the crown of the smaller piston starts to uncover the upper groove 39.

Curve 6001 (6002) can be made to lag behind curve 6000 so that at most crank angle positions, prior to ingression at point 6003 (6004), the larger piston 16 has moved forward more than the smaller piston 18 and in so doing has produced a larger pressure rise in the larger cylinder 12 than the pressure rise experienced in the first volume 15a of the smaller cylinder 14. It will be appreciated that the movements illustrated in FIGS. 8a and 8b show that during the compression stroke the larger piston decreases the Volume in the larger cylinder proportionally faster than the corresponding decrease in the first volume of the smaller cylinder. Point 6003 (6004) represents the point of ingression along the remaining stroke length of the smaller piston. The relative lag of the smaller piston 18 behind the larger piston 16 can be achieved by the profile of cam 500 (FIG. 5) and/or by moving the angular position of the cam which actuates the smaller piston, relative to the crankshaft which actuates the larger piston.

The Ingression Process in The Merritt Engine

The Ingression Process follows the segregation process and is the transference of the contents of the first volume 15a of the smaller cylinder 14 into the combustion chamber 20, across the edge 37 of the crown 35 of the smaller piston 18. This occurs near the end of the compression stroke of the smaller piston 18 and is explained with the aid of FIG. 10. The contents of the first volume 15a of the smaller cylinder 14, at this time, contain fuel which may be either fully vaporised or partially vaporised, and a further amount of some air and possibly some gaseous products of combustion. This mixture is very fuel rich and starved of oxygen, and will therefore not readily burn even at the end of the compression stroke. When it is transferred into the combustion space 20, where most of the intake air is contained, the fuel can start to be burnt readily after finding oxygen and after ignition.

When the edge 37 of the crown 35 of the smaller piston 18 reaches the edge of the groove 39, the segregation process breaks down. Gases contained in the first volume 15a of the smaller cylinder are then displaced into the combustion space 20 by further movement of the piston 18. The fuel rich gas is deflected by the groove in a radial and downward direction and mixes with air which rotates within the combustion space around the cylindrical wall. When the piston 18 finally impacts on the seat 515, the fuel has been ejected into the combustion space 20, including any liquid fuel which did not vaporise during the segregation period.

The thickness T (FIG. 10) of the edge of the crown 35 of the smaller piston influences the position of piston 18 at which ingression starts. The bigger the thickness T the later ingression starts.

The timing of the onset of ingression may vary according to engine design, particularly according to the ignition method used. If compression ignition is used, the timing of ingression determines the onset of combustion but the combustion process will not end until the smaller piston reaches its seat and delivers all the fuel into the combustion space, where the oxygen is present. If STCI is used, ingression may start earlier, before spark ignition occurs. Its precise timing is less critical since the start of combustion is now controlled by the timing of the spark which has to take place after ingression has started.

The timing of the start of the ingression process slightly precedes the timing of ignition, since the fuel needs to mix with the oxygen in the combustion space to allow a sustainable combustion process. As the ingression process takes time, it is necessary to synchronise the timing of the ingression process with the desired timing of the combustion process in relation to the position of the larger piston. One preferred solution is to promote a late ingression of a short duration.

Figure 8A:
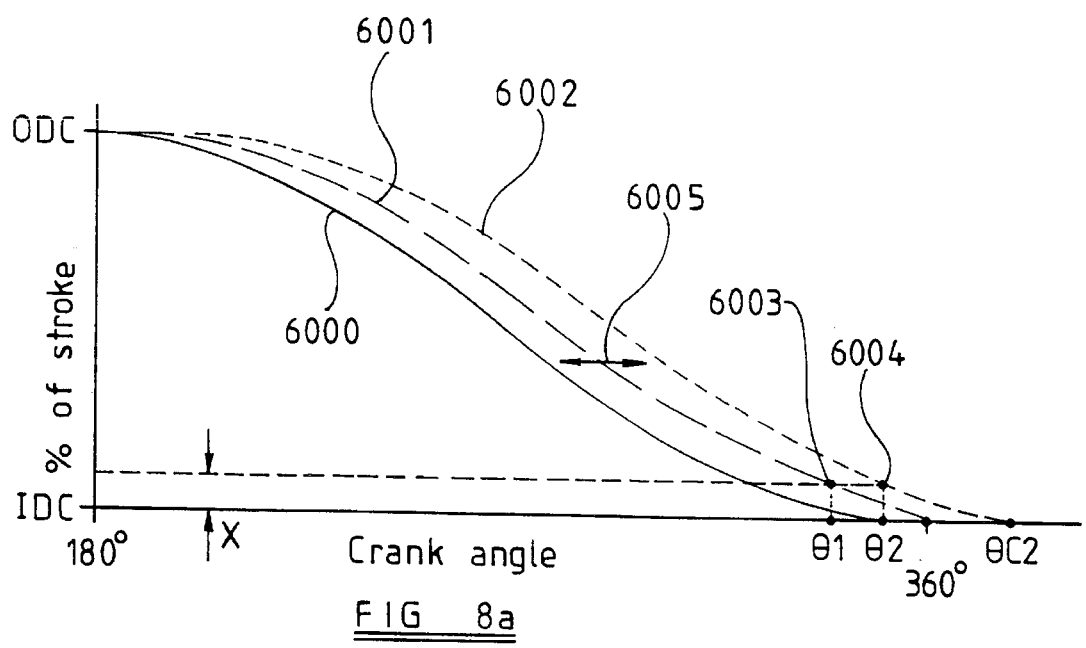
FIG. 8a shows crank angle displacement curves for the larger and smaller pistons of the engine of FIGS. 5 and 6 during the compression strokes, illustrating a method of control for the ingression process.
Figure 8B:
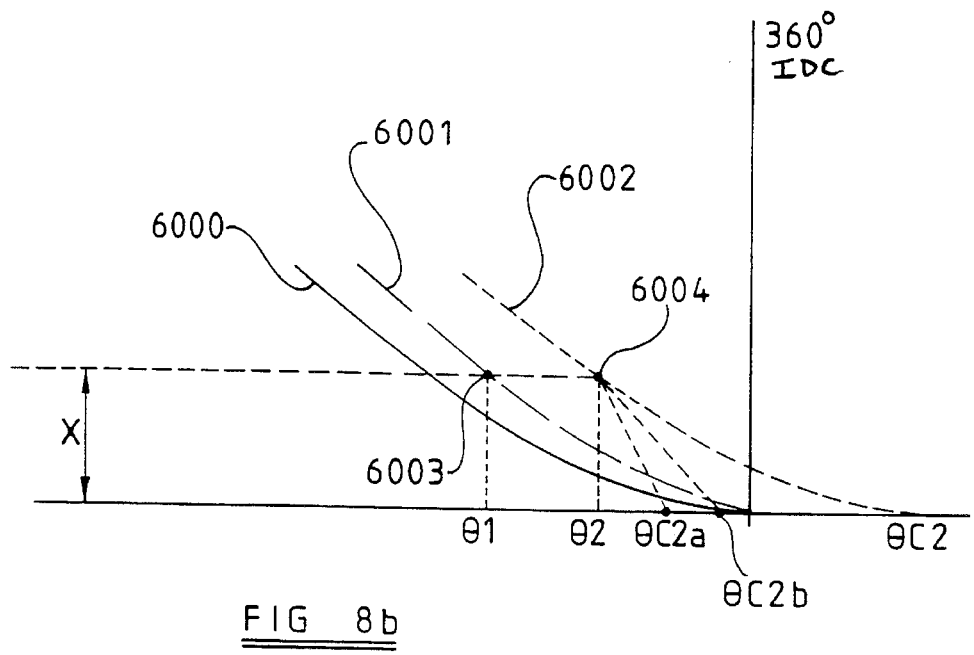
FIG. 8b is a detail of FIG. 8a showing the control over the duration of the ingression process.

FIGS. 8a and 8b described earlier with reference to the segregation process, show how the timing and duration of the ingression process can be controlled. Curves 6001 and 6002 show two possible movements for the smaller piston 18, using one cam profile and brought about by altering the phase angle between the camshaft (which actuates the smaller piston) and the crankshaft (which actuates the larger piston). Points 6003 and 6004 represent the beginning of the ingression process which can be determined physically by the arrival of the smaller piston at the beginning of the upper groove, as shown in FIG. 10. Both these points are shown to lie on a common line at distance x from the end of the stroke, the distance x representing the position of the start of the groove 39.

In FIG. 8a the double arrow 6005 shows the effect on the start of the ingression process, of changing the phase between the camshaft and crankshaft. As a result, ingression starts at crank angles $\Theta1$ and $\Theta2$, respectively, for curves 6001 and 6002. Increasing the lag angle between curve 6000 and curve 6001 produces curve 6002. Curve 6002 shows that at each crank position the smaller piston is lagging a further distance behind the position of the larger piston compared with curve 6001. This piston distance lag is one of the ways in which the onset of segregation can be controlled since it controls the successive volume ratios for the two pistons 16, 18 during the compression stroke. It can be seen that the lag also affects the position of the smaller piston 18 at which the onset of ingression occurs (shown at either point $\Theta1$ or point $\Theta2$). The lag also delays the end of the ingression process.

FIG. 8b shows an enlarged part of FIG. 8a to illustrate the control over the duration of the ingression process. The ingression period on curve 6002 is represented by the angular movement of the crankshaft from $\Theta2$ to $\Theta C2$. Increasing the lag of the smaller piston 18 from position 6001 to 6002 delays both the start (from $\Theta1$ to $\Theta2$) and the end (from IDC to $\Theta C2$) of the ingression process. The end at $\Theta C2$ is shown on the diagram to have moved into the beginning of the expansion stroke of the larger piston 16 and this may be an unwanted consequence of delaying the start of the ingression process. To overcome such a disadvantage the profile of cam 500 may allow a sudden disengagement from the smaller piston 18 after reaching the point for the start of ingression at $\Theta2$. A possible cam profile for such an arrangement is shown in FIG. 21. Using this cam profile, the broken curves 6004 to $\Theta C2a$ or 6004 to $\Theta C2b$ show the position of the smaller piston 18 during the ingression process. Before it reaches point 6004, the smaller piston's movement is controlled by the cam profile. After point 6004, that is after the ingression process starts, the smaller piston 18 is free to accelerate to the highest velocity obtainable as a result of the action of spring 501 and gas force affecting the smaller piston at that position. This free movement is time dependent and the end of the ingression process therefore occurs at a later crank angle at higher engine speeds (at point $\Theta C2b$) compared with a lower engine speed (at point $\Theta C2a$). This is not a disadvantage if the whole ingression process can take place rapidly, for instance over eleven degrees of crankangle rotation, at higher engine speeds. For example, at an idling speed of 600 rpm the ingression process may extend over two crank angle degrees (from ten degrees of crank rotation of the larger piston 16 before inner dead centre, to eight degrees of crank rotation before inner dead centre). At 6000 rpm the ingression process may extend over eleven crank angle degrees (from ten degrees of crank rotation before inner dead centre position and end at one degree after inner dead centre position for the larger piston).

Before the start of the free acceleration movement of the smaller piston 18 at point 6004, the smaller piston will be moving faster at an engine speed of 6000 rpm than at 600 rpm and this assists in promoting a short ingression process at the higher engine speed.

At the end of the ingression process the smaller piston comes to rest when the crown of piston 18 comes into contact with its seat 515. The impact is cushioned by the gas which is rapidly displaced from the first volume 15a of the smaller cylinder 14. The resulting high velocity of the ingressing gases (arrow 5111 in FIG. 10) help the mixing of fuel and air in the combustion space 20.

The arrangement described above promotes a late ingression of a very short duration. This process may be very suitable for use with spark triggered ignition in a pure Merritt mode of operation where all the fuel is introduced into the smaller cylinder 14. In such an arrangement ignition could take place as soon as ingression starts and the combustion period can be short at all engine speeds, thus promoting very high thermal efficiency.

Figure 23:
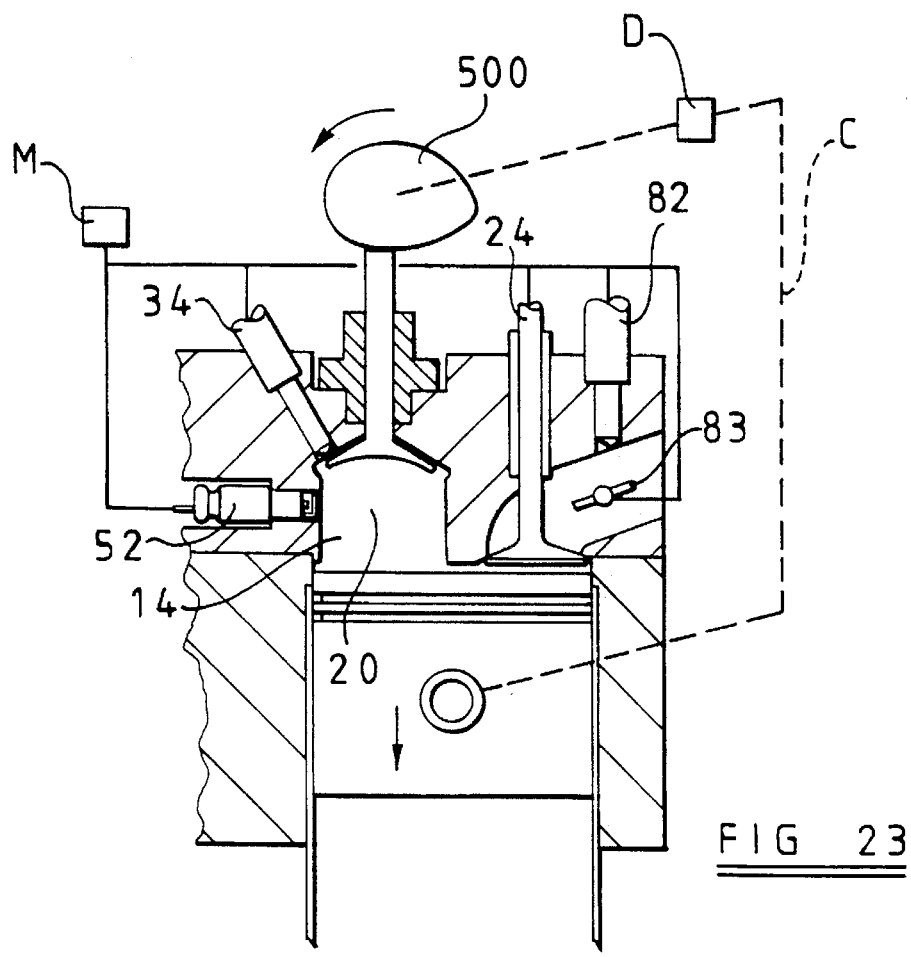
FIG. 23 is a view of a modified form of the engine of FIG. 5 for operation in a SIGE hybrid mode.
Figure 24A:
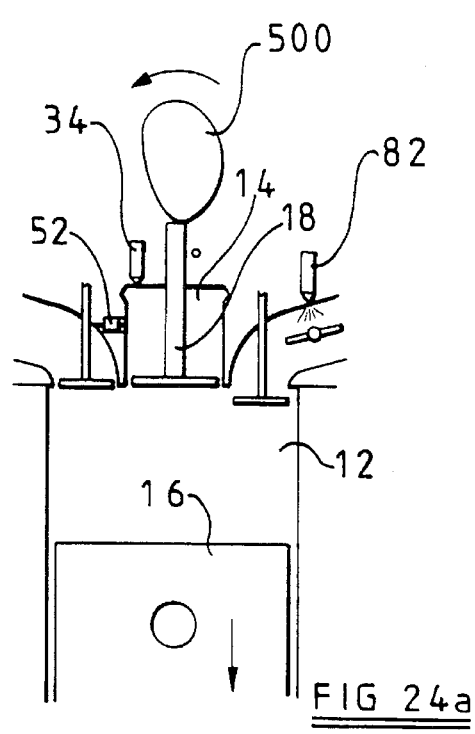
FIGS. 24a, 24b, 24c and 24d are views similar to those of FIGS. 7a to 7d for the engine of FIG. 23 operating with an extended induction stroke for the smaller piston and Direct Ingression.
Figure 24B:
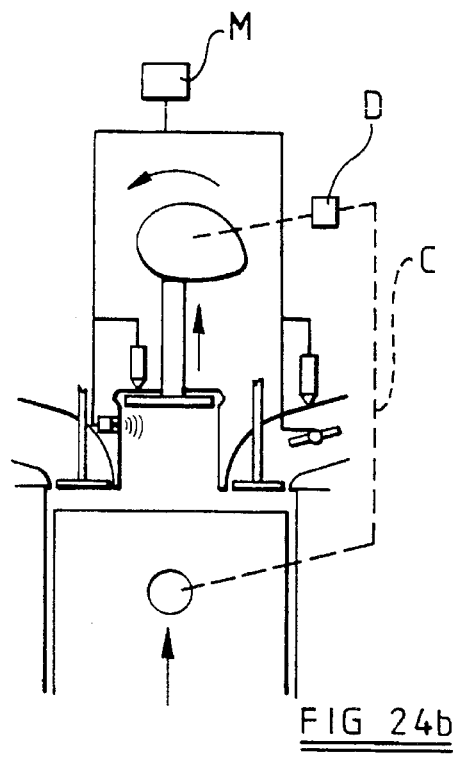
Figure 24C:
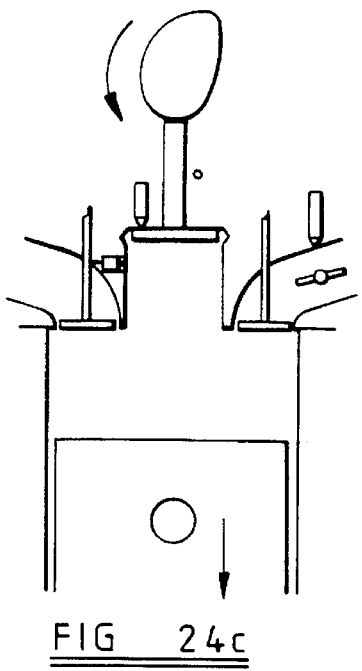
Figure 24D:
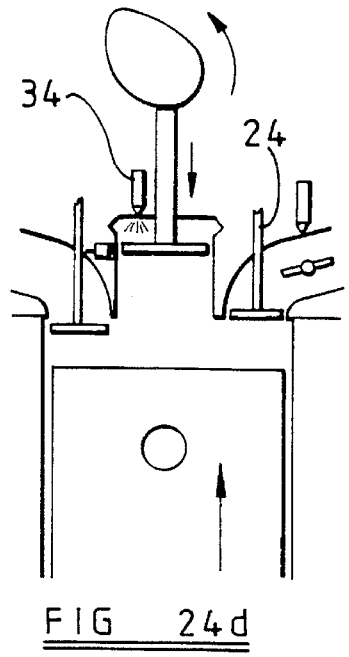
Figure 25A:
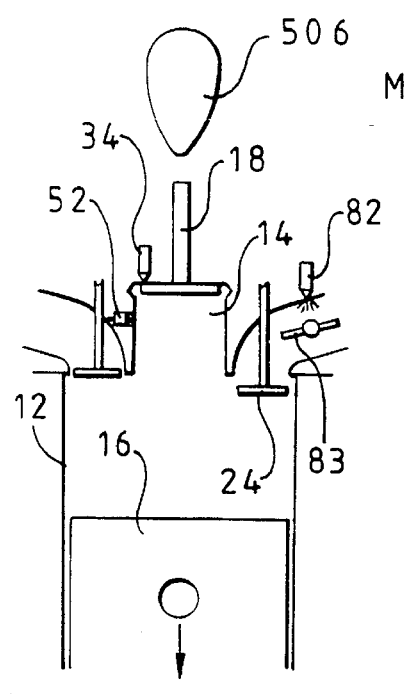
FIGS. 25a, 25b, 25c and 25d are views similar to those of FIGS. 7a to 7d for the engine of FIG. 23 operating in a pure SIGE mode with a stationary smaller piston.
Figure 25B:
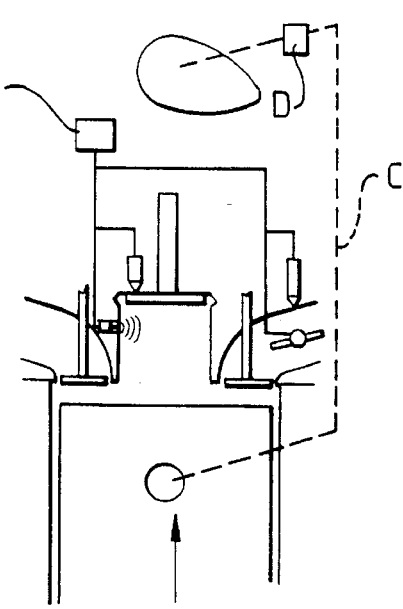
Figure 25C:
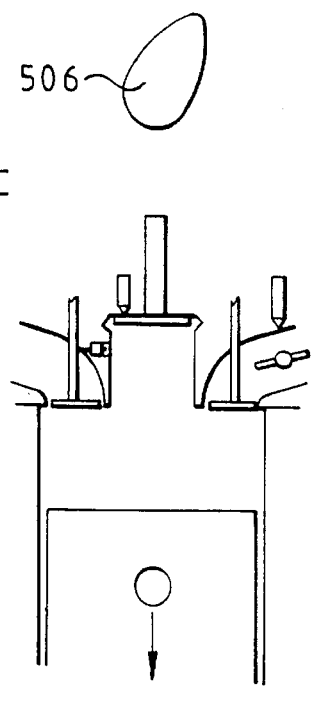
Figure 25D:
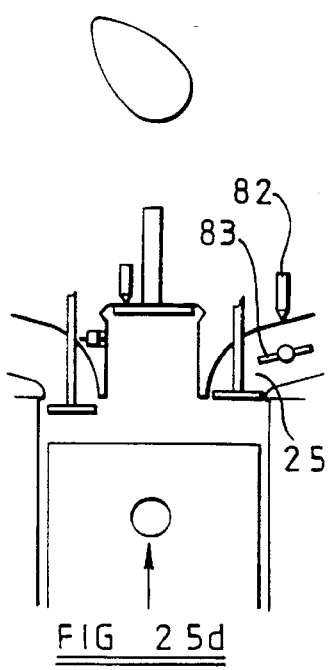

An alternative arrangement is to promote an ingression process over a given crankangle duration under the influence of the cam profile at all times. This is illustrated by the continuation of curve 6001 to the ingression end at inner dead centre position (360 degrees crankshaft position). In this case ignition timing may need to be delayed until after the start of the ingression process at point $\Theta1$ and this can be done with the aid of a timed spark, if compression ignition is deliberately avoided. After ignition takes place the rich fuel mixture which is still ingressing can burn and ignite the fuel which has ingressed earlier. This earlier fuel has formed a leaner air fuel mixture after mixing with the air in the combustion chamber 20. If this lean air fuel mixture already in the combustion space 20 cannot be ignited in this way (for example, when the engine is idling and using little fuel) the air inlet duct 25 to the larger cylinder may be partially throttled. This reduces the air quantity in the combustion chamber 20 at the time of ignition and, in so doing, enriches the air fuel mixture within the combustion space 20 at the time of ignition. Such an optional throttle valve 83 is shown in FIG. 23 but it is advisable to minimise the use of a throttle valve for this purpose, since it can lower the thermal efficiency of the engine. Alternatively or additionally, the rich fuel/air mixture emerging from the first volume 15a of the smaller cylinder 14 during ingression may be stratified to remain ignitable in the combustion chamber 20 by a spark.

When using the Merritt engine in Merritt/diesel hybrid form using compression-ignition, the ingression of fuel/air mixture at point Θ2 shown in FIG. 8b will trigger the ignition of the small quantity of fuel which entered the smaller cylinder in the Merritt mode. This promotes the torching of the main charge of fuel which enters the combustion chamber separately and in time to promote an optimum combustion period in relation to crankangle positions. In such an engine the compression ignition of only a small quantity of torching fuel may take place in advance of the main fuel injection process without causing appreciable negative work at the end of the compression stroke.

The Ignition Process In the Merritt Engine

The Merritt engine is a segregating engine which delivers gaseous fuel into the combustion chamber. Therefore, apart from using either compression ignition or STCI to start the combustion process, the Merritt engine can also use continuous ignition devices such as a glow plug or a layer of catalytic material e.g. Platinum, deposited on the wall of the combustion chamber 20. Continuous ignition devices cannot be used if the Merritt engine is hybrided with a SIGE combustion system.

To use compression ignition, the Merritt engine, like the diesel engine, needs to match a suitable fuel with a compression ratio high enough for compression ignition of the fuel. Using diesel fuel, pure Merritt engines designed as Direct Ingression engines may Use compression ratios of, for example, 14:1 to 16:1. The compression ratio needed to ignite a pre-vaporised diesel fuel in a Merritt engine can be lower than the compression ratio used in a diesel engine, where liquid fuel is ignited only after some of the fuel extracts heat from the hot air during the process of vaporisation. Merritt engines designed as Indirect Ingression engines may need higher compression ratios, for example, 18:1 to 20:1. These are again values which maybe less than the requirement of a typical IDI diesel engine.

The use of STCI is possible in the Merritt engine because fuel is pre-vaporised in the first volume 15a of the smaller cylinder 14 before ignition takes place. If STCI is used, unaided premature compression ignition should be avoided. Therefore, the compression ratio of the engine needs to be matched to the fuel used, in order to avoid unaided compression-ignition. For example, if high octane gasoline is used, a compression ratio of, for example, 10:1 may be suitable.

The STCI process requires an ignitable mixture at the electrodes of the spark plug 52. It is therefore important to position the spark plug in an appropriate place where both fuel and air can be brought together near the electrodes.

One such suitable arrangement is shown in FIG. 14 where the spark plug electrodes lie in a cavity 1152 in the wall 14a of the smaller cylinder. The cavity is shown in a position slightly below groove 39 and opens into the groove 39 to allow rich gasified fuel to reach the spark plug electrodes. Air swirling around the wall of the combustion space 20 is directed towards the spark plug electrodes by a lower portion 1153 of the cavity. The resulting mixture can allow the spark to initiate a flame which can then proceed to move around the groove 39. Given a suitable choice of compression ratio for the engine, once spark ignition of some fuel takes place, the subsequent rise of pressure and temperature can be sufficient to trigger the compression ignition process for further gaseous fuel emerging from the first volume 15a of the smaller cylinder into the combustion space 20. The STCI process is different from normal spark ignition as used in SIGE, where a stoichiometric air/fuel mixture is ignited by a spark which sets off a flame front capable of traversing the whole mixture. In the Merritt engine, like the diesel engine, mixing of fuel and air takes place during the combustion process and cannot be completed until all the fuel is delivered to the combustion space.

The combustion space of a pure Merritt engine can be operated at higher temperatures than the combustion chamber of a typical SIGE as the fuel does not enter the combustion space until ignition is required.

The Torching Ignition Capability in Merritt Engine hybrids

The segregation process used in the Merritt engine according to this invention can be used to provide a high energy ignition source which ignites fuel delivered to the combustion space 20 from fuel sources other than the fuel supply to the first volume 15a of the smaller cylinder.

Figure 16:
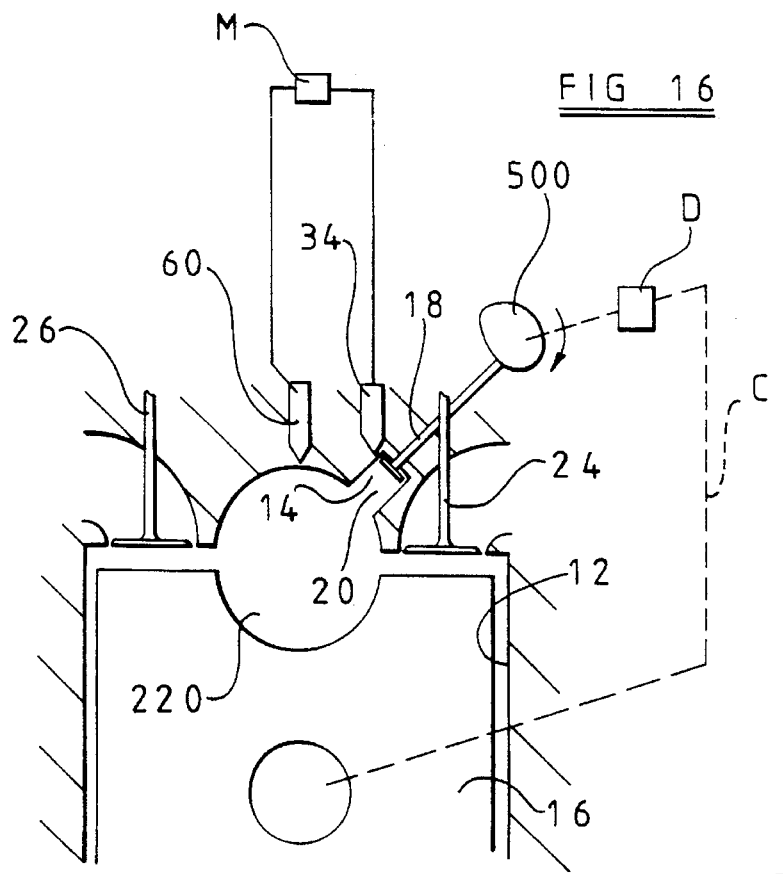
FIG. 16 is a view similar to that of FIG. 5 showing a fifth, Direct Ingression embodiment of an engine according to the present invention, in a diesel hybrid torching arrangement.

Two such examples of this application are shown in FIGS. 15 and 16.

The arrangement of FIG. 15 is suitable for use with homogeneous fuel/air mixtures which are normally ignitable by spark plug.

In FIG. 15 a second fuel supply, through injector 82, provides fuel directly to the larger cylinder 12. The smaller cylinder 18 has a smaller swept volume ratio E which is just sufficient to vaporise a small fuel quantity, for example 10% of the stoichiometric fuel quantity (fuel ratio F=10%). The quantity of fuel delivered per engine cycle through injector 34 may be constant or it may vary according to the energy needed for the ignition process. This fuel is shown delivered by low pressure injector 34 but other low pressure metering devices can be used. For example, the movement of the stem of the smaller piston may be used to pump a constant quantity of fuel, once per cycle. The fuel may be either the same as the fuel delivered by injector 82 or it can be a more volatile fuel or a gaseous fuel.

The smaller cylinder is provided with a spark plug 52 to ignite the fuel/air mixture ingressing into the combustion space 20. The combustion space 20 is shown communicating with a larger wedge shaped combustion chamber 220 which is designed to meet the needs of the larger cylinder 12. The fuel gas mixture in the first volume 15a of the smaller cylinder can be made readily ignitable by spark, for example, it can be made stoichiometric.

The second low pressure injector 82 delivers fuel to the inlet duct 25 supplying air to the larger cylinder 12. The throttle valve 83 may be necessary to control the power output of such an engine. The fuel supply through injector 82 may be less than the quantity needed for a stoichiometric mixture to be formed in the larger cylinder 12 during the induction and compression strokes. The larger cylinder 12 is therefore operating as a lean burn engine and spark plug 52 may not be capable of providing enough energy unaided to ignite the lean mixture at the end of the compression stroke. However, the fuel/air mixture ingressed from the first volume 15a of the smaller cylinder is more easily ignitable by the spark plug 52 and, following this ignition, the flame so produced can ignite the lean mixture delivered to the combustion chamber 220 by the larger piston 16. In such an arrangement the engine may be able to idle using only the fuel delivered by injector 34, with injector 82 switched off. At lower part loads throttle 83 may be necessary for adjusting the lean mixture strength for ignition by the torching flame from the smaller cylinder. Alternatively, extra fuel may be delivered to the smaller cylinder by injector 34 until injector 82 can be activated, to produce a lean mixture of sufficient strength for ignition, by the torching flame.

The torching fuel may be petrol or a gaseous fuel such as hydrogen or self-vaporising liquid fuels such as propane or butane.

The arrangement shown in FIG. 15 is also suitable for use with near homogeneous fuel/air mixtures supplied to the larger cylinder 12. The smaller cylinder 14 is made as small as possible with as small a spark plug as possible to generate plasma to ignite the air/fuel mixture in the combustion space 20 instead of a direct conventional spark plug. The smaller cylinder, piston and spark plug assembly may even be screwed into a cylinder head of a conventional SIGE engine instead of a conventional spark plug. In such an arrangement the smaller piston 18 may be electrically actuated.

The arrangement shown in FIG. 15 also has an inclined axis for the movement of the smaller piston. Such a mechanical arrangement may offer advantages of layout for the actuating mechanisms for the inlet and exhaust valves 24 and 26 and the smaller piston 18.

FIG. 16 shows another arrangement for a Merritt engine used in a hybrid torching mode. The arrangement shown is suitable for use with fuels which are normally ignitable by compression ignition such as diesel fuel. A spherical combustion chamber 220 formed partially in the cylinder head and partially in the crown of the larger piston 16 serves the needs of the larger cylinder 12 and is shown as an example of one of various possibilities for combustion chamber arrangements. The first volume in the smaller cylinder is supplied with fuel by injector 34 which can be a low pressure injector. This fuel is used to torch ignite further fuel supplied to the combustion space by a second high pressure injector 60. This arrangement is a typical diesel hybrid arrangement for the Merritt engine where injector 60 is a typical high pressure diesel injector, whereas injector 34 may be a low pressure injector delivering a small quantity of either diesel fuel or another more volatile fuel or gaseous fuel, to the smaller cylinder. In such an arrangement the segregated fuel delivered by injector 34 is shown ignited by compression ignition, without the use of a spark plug. However, it is possible to torch ignite diesel engines with a volatile fuel such as gasoline which is supplied through injector 34 and ignited by spark using the STCI process described with reference to FIG. 15. One advantage of such a Merritt/diesel hybrid engine is to reduce or even eliminate the ignition delay period, typical of the diesel engine, to the point where the familiar noisy diesel knock can disappear. Another advantage is to lower the smoke or particulate emission of the diesel engine and to speed up the combustion process, and in so doing to increase the power density of the diesel engine.

The Merritt engine in Pure and Hybrid Forms

1 The Pure Merritt engine Mode

Whilst operating in the pure Merritt mode, for example in the fuel ratio F range of 10% (for idling) to 80% at maximum BMEP, the air inlet to the larger cylinder 12 may be unthrottled and without any fuel. The pure Merritt mode is unlikely to burn fully a fuel ratio F=100% as some of the air present in the larger cylinder cannot mix with the fuel during the combustion process. Moreover, the burning of fuel in the ratio F from 80% to 90%, for example, may produce undesirable oxides of Nitrogen in the exhaust gases whilst some oxygen is also present in the exhaust gases. This will render ineffective the conventional three way catalytic converter used to process the exhaust gases. Below a fuel ratio of, for example, 80%, the presence of about 20% excess air may be sufficient to lower the temperature of the combustion gases so as to avoid the formation of oxides of Nitrogen.

Figure 13C:
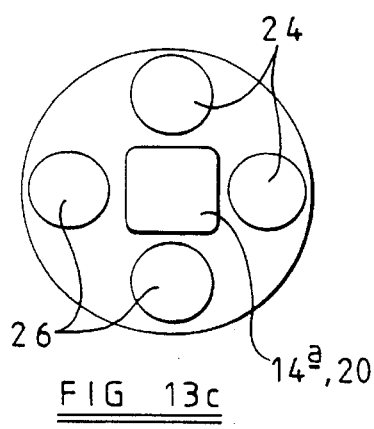
Figure 13D:
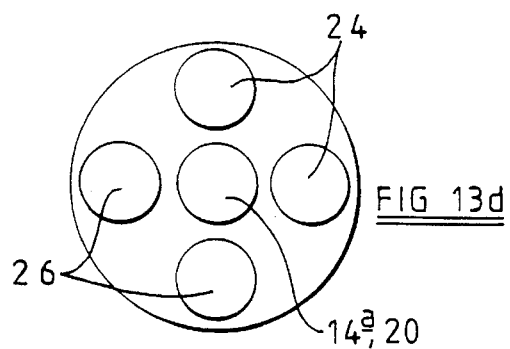

In the pure Merritt mode the swept volume ratio E of the smaller cylinder is maximised to cope with the largest quantity of fuel. In the Direct Ingression embodiment shown in FIG. 5 the diameter of the crown of the smaller piston 18 is limited by the need to provide sufficient area on the flame plate for the inlet and exhaust valves 24 and 26, although the shape of the crown 35 can be non circular, as shown in FIG. 13c. The swept first volume 15a in the smaller cylinder may also be increased by increasing the stroke of the smaller piston 18 which is controlled by the drive mechanism. The simple direct overhead cam shown in FIG. 5 may provide stroke distances of up to 20 mm, for example. A conventional cam actuated rocker mechanism, not shown, can amplify the movement, up to for instance 30 mm stroke. The double cam, beam arrangement, shown in FIG. 26 can amplify the cam lift considerably, for example by a factor of five, in a compact arrangement. In FIG. 26 two cams, 500, coupled together for instance by gears (not shown), rock a beam 519 which is kept in contact with the cams by springs 501. The end of beam 519 is attached to the stem 234 of the smaller piston 18 by pin 236 and the side thrust is taken by collar 235.

FIG. 7 shows an extended period of induction stroke for the smaller piston 18 which can be as long as 360 degrees crank angle or 180 degrees of cam angle. Such a long duration of cam lift is provided by the profile of cam 500 which is less demanding in terms of the stress between the cam and its followers, for a given stroke distance, in comparison with the cam profile 506 shown in FIG. 25.

The volume ratio E of the smaller cylinder can alternatively be enlarged by increasing the diameter of the bore whilst using the Indirect Ingression embodiment shown in FIG. 11. In this embodiment there is much less interference between the inlet and exhaust valves and the orifice 2161 which can be positioned near the circular edge of the flame plate adjacent to the bore of the larger cylinder. The diameter of the smaller piston can therefore be increased and for a given swept volume the stroke of the smaller piston may be decreased.

Table I summarises, by the way of an example, the pure Merritt mode of operation for a four stroke engine. The values of E and fuel ratios F are only given for the purpose of illustration.

TABLE I

Pure Merritt mode - Indirect Ingression embodiment as illustrated in FIG. 21, typically for use in a passenger vehicle for high fuel economy in urban driving
Swept Volume Ratio E = 12% to 5%
Fuel = Gasoline (volatile)
Compression ratio = 10:1, short ingression process
Spark Triggered Compression-Ignition (STCI)

| Total Fuel Ratio F for engine (%) | F in smaller cylinder (%) | F in larger Cylinder (%) (unthrottled) |
|---|---|---|
| 10 | 10 | 0 |
| 50 | 50 | 0 |
| 80 (Maximum) | 80 | 0 |

Figure 17:
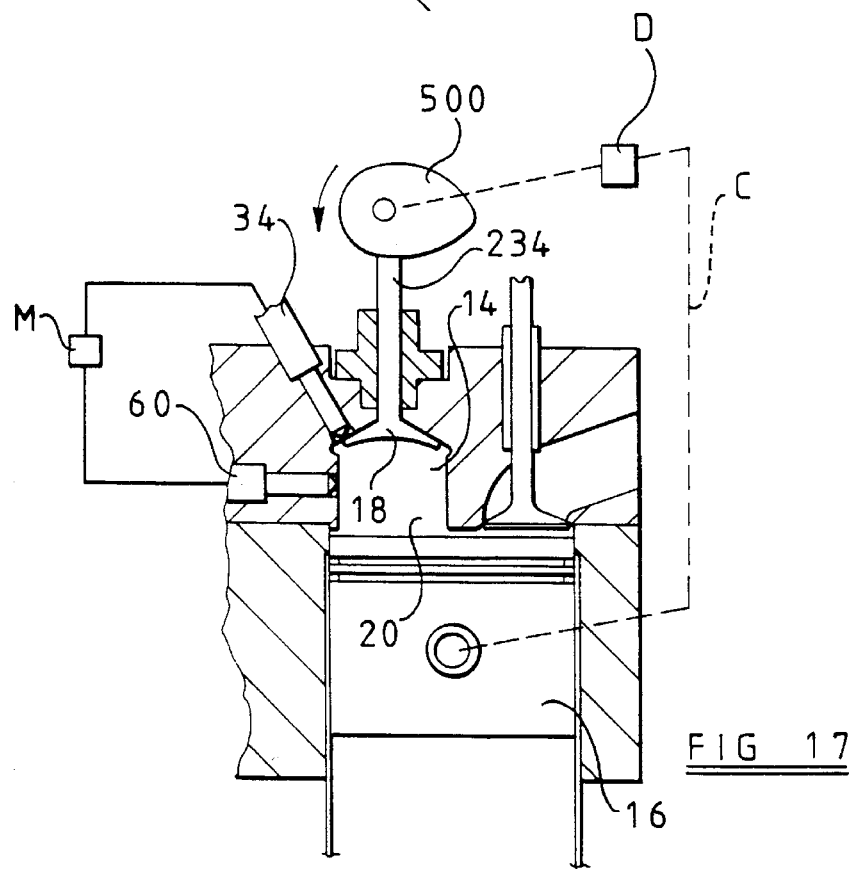
FIG. 17 is a view similar to that of FIG. 5 showing a sixth, Direct Ingression embodiment of an engine according to the present invention, in a diesel hybrid arrangement, with two fuel injectors for the smaller cylinder.

For a typical engine with a swept volume ratio E = 11% the following values would apply:

Swept volume (larger cylinder) = 500cc
Swept volume (smaller cylinder) = 60cc
Required combustion chamber volume = 60cc 2 The Merritt/diesel hybrid forms FIG. 17 shows the Merritt engine in hybrid arrangement with a diesel engine and FIG. 18 shows a four stroke sequence of operation of such an engine. In this arrangement two fuel injectors are used governed by fuel control means M. Injector 34 is a low pressure fuel supply for the Merritt mode and injector 60 is a high pressure fuel injector for the diesel mode. Injector 34 delivers fuel to the first volume 15a in the smaller cylinder during the induction stroke of the smaller piston. This starts during the exhaust stroke of the larger piston. Only a small quantity of fuel is delivered in the Merritt mode, for example a Fuel Ratio F=10%, and the quantity can remain constant or vary with engine load and speed depending on the combustion characteristics of a particular combustion chamber design. The second injector 60 (a typical diesel fuel injector) is positioned to deliver the remaining quantity of diesel fuel for an even distribution within the combustion chamber 20. FIG. 22 shows suitable positions for the two injectors 34 and 60.

The engine shown in FIG. 17 is ignited by compression-ignition.

The sequence of operation of this engine in a four stroke cycle is described with the aid of FIGS. 18a to 18d.

Figure 18A:
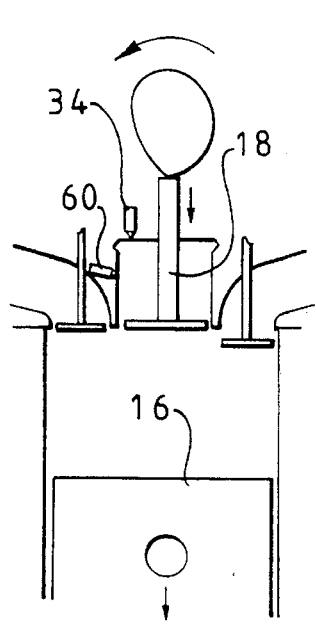
FIGS. 18a, 18b, 18c and 18d are views similar to those of FIGS. 7a to 7d for the engine of FIG. 17.
Figure 18B:
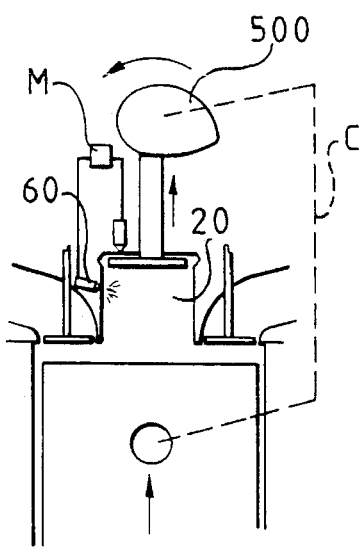
Figure 18C:
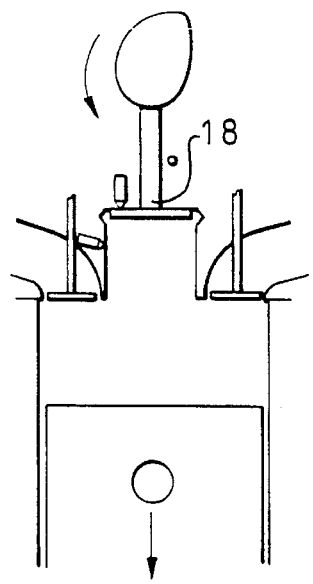
Figure 18D:
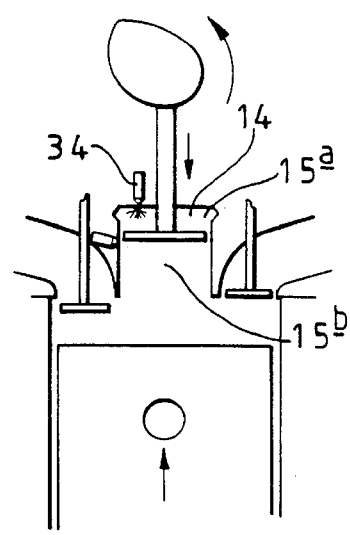

FIG. 18d represents the exhaust stroke of the larger piston 16 and the beginning of the induction stroke of the smaller piston 18. A small quantity of diesel fuel is injected into the first volume 15a in the smaller cylinder 14 by a low pressure injector 34 governed by fuel control means M. A small amount of exhaust gases also enters the smaller cylinder through the gap 128 during the early part of the induction stroke.

During the induction stroke of the larger piston (FIG. 18a) the smaller piston continues with its induction stroke. Near the end of the compression strokes for both pistons (FIG. 18b) the vaporised fuel in the smaller cylinder is ingressed into the combustion chamber 20 where it ignites by contact with hot air in a process known as compression-ignition. At this moment the second injector 60, which is a typical diesel injector, delivers its fuel as shown in FIG. 18b. The fuel ignites very rapidly under the influence of the torching flame or the temperature rise produce by the burning of fuel in the Merritt mode. During the expansion stroke, shown in FIG. 18c, the smaller piston 18 remains parked at its inner dead centre position and does not obstruct the process of combustion within the combustion space 20.

The Merritt/diesel hybrid mode is a torching arrangement where the second cylinder is used to provide a rapid and powerful ignition source for the main diesel fuel delivery, as described previously with regard to FIG. 16.

Figure 19:
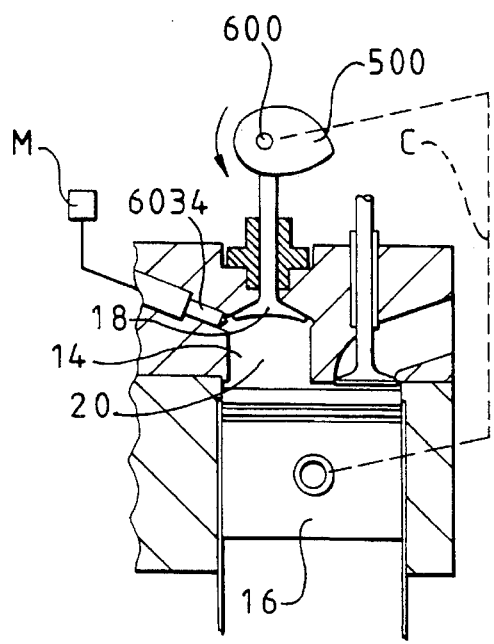
FIG. 19 is a view similar to that of FIG. 5 showing a seventh, Direct Ingression embodiment of an engine according to the present invention, in a diesel hybrid arrangement, with one fuel injector for the smaller cylinder.

A second arrangement for the Merritt/diesel hybrid mode is shown in FIG. 19 and the cyclic sequence of operations as a four stroke engine is shown, in FIG. 20. In this arrangement, a single fuel injector 6034, which is a high pressure injector, serves the dual purpose of delivering a small quantity of fuel, for example F=10%, during the induction stroke of the smaller piston 18 (FIG. 20d) and the remaining larger quantity of diesel fuel near the inner dead centre position of the larger piston 16, during ingression and/or after the ingression process has taken place, as shown in FIG. 20b. The positioning of such an injector 6034 is such that it is capable of delivering the first quantity of fuel into the first volume 15a in the smaller cylinder 14 during the induction stroke of the smaller piston Whist the second quantity of fuel, about 500 crank-angle degrees later, is delivered directly into the combustion space 20 near the end of the compression stroke of the larger piston 16. The double fuel delivery per cycle can be spaced some 220 and 500 crank angle degrees apart and can be electronically controlled. Such electronically controlled diesel fuel injection systems have recently been introduced for use with diesel engines. A suitable position for injector 6034 is further illustrated in FIG. 22.

Figure 20A:
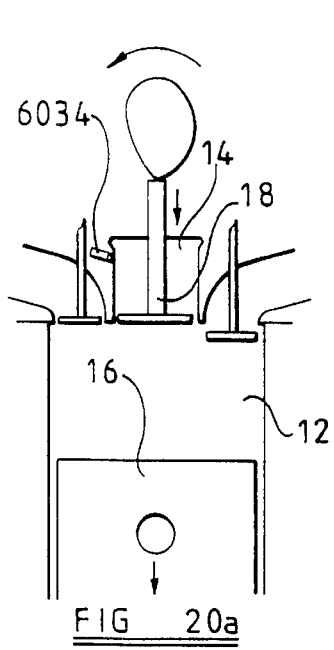
FIGS. 20a, 20b, 20c and 20d are views similar to those of FIGS. 7a to 7d for the engine of FIG. 19.
Figure 20B:
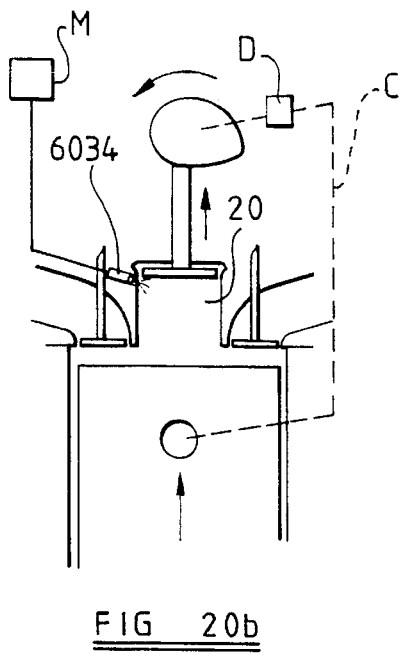
Figure 20C:
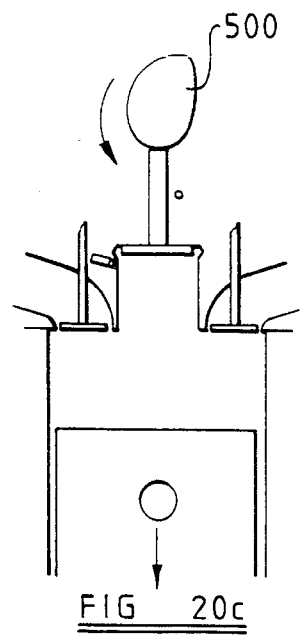
Figure 20D:
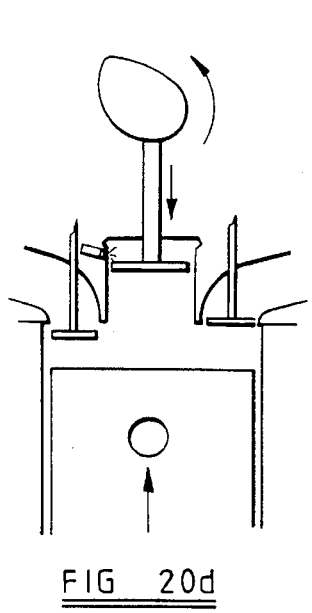

FIG. 20c shows the expansion stroke for the larger piston 16 when the smaller piston 18 remains parked at its inner dead centre position.

With the Merritt/diesel hybrid arrangement of FIGS. 18 and 20 it will be appreciated that the two combustion systems run concurrently.

Tables II and III summarise, by way of example, the Merritt/diesel hybrid modes of Operation. The quantities of fuel ratios F tabulated are chosen only for the purpose of illustration.

TABLE II

Merritt/diesel hybrid mode - Direct Ingression embodiment, using one double-pulsed high pressure fuel injecter as illustrated in FIGS. 19 and 20 - typically for use in a passenger vehicle
Swept Volume Ratio E = 5%
Fuel = Diesel fuel
Compression ratio = 16:1
Unaided compression-ignition

| Total Fuel Ratio F for engine (%) | F in smaller cylinder (%) | F in larger Cylinder (%) (unthrottled) |
|---|---|---|
| 10 | 10 | 0 |
| 20 | 10 | 10 |
| 50 | 10 | 40 |
| 100 | 10 | 90 |

For the swept volume ratio E=5% the following values would apply:

Swept volume (larger cylinder)=500 cc swept volume (smaller cylinder)=25 cc

Additional combustion chamber volume (within the smaller cylinder)=8 cc

TABLE III

Merritt/diesel hybrid mode - dual fuel mode with a high pressure fuel injector 60 for the diesel mode and a low pressure fuel injector 34 for the Merritt mode, as illustrated in FIG. 17 - typically for use in a heavy goods vehicle
Swept Volume Ratio E = 3%
Fuel = Diesel fuel for larger cylinder
Fuel = Gasoline (or propane gas) for smaller cylinder
Compression ratio = 14:1
Spark triggered compression-ignition (not shown in FIG. 17)

| Total Fuel Ratio F for engine (%) | F in smaller cylinder (%) | F in larger Cylinder (%) (unthrottled) |
|---|---|---|
| 6 | 6 | 0 |
| 20 | 6 | 14 |
| 50 | 6 | 44 |
| 100 | 6 | 94 |

For the swept volume ratio E=3% the following values would apply:

Swept volume (larger cylinder)=2000 cc

Swept volume (smaller cylinder)=60 cc

Additional combustion chamber volume (in the larger piston crown—not shown)=94 cc It will be appreciated that a pure Merritt engine using diesel fuel with compression ignition is not a diesel engine. Such a Merritt engine (shown in FIG. 11 in an Indirect Ingression embodiment and in FIG. 12 in an Intermediate Ingression embodiment) uses only one fuel supply which communicates with the first volume 15a in the smaller cylinder and which delivers fuel at low pressure during the induction stroke of the smaller piston 18. A pure Merritt engine can operate with diesel fuel as a compression-ignition engine and is nevertheless not a hybrid diesel engine when operating in the pure Merritt mode. For instance, the Indirect Ingression mode Merritt engine, the smaller cylinder of which is shown in FIG. 14, can use diesel fuel possibly in combination with spark assisted ignition or STCI. However, since all the fuel is delivered to this engine through injector 34 during the induction stroke of the smaller piston, the engine remains a pure Merritt engine and is not in diesel hybrid form.

3 The Merritt/SIGE hybrid engine arrangements

These arrangements allow the pure Merritt engine to operate sequentially with a SIGE or spark ignition gasoline engine in the same engine structure. The arrangement is shown in FIG. 23.

FIG. 23 shows an additional low pressure injector 82 and a throttle valve 83 situated in the inlet duct of the larger cylinder 12 in an arrangement typical of a SIGE engine. Spark plug 52 is situated in the combustion space 20 and serves a dual purpose. It ignites the ingressed fuel in the Merritt mode in the STCI ignition process or alternatively it ignites a pre-mixed stoichiometric air fuel mixture in the pure SIGE mode.

The hybrid arrangement with gasoline type engines has the advantage of allowing the use of a stoichiometric air fuel mixture operation at the higher range of fuel ratios F values, for example from 80% to 100%. In so doing all oxygen from the exhaust gases is removed to allow the use of a three way catalytic converter. F values in the range 80% to 100% cause the formation of most of the oxides of Nitrogen in engine exhaust gases.

The Merritt/SIGE hybrid mode can be described as a Merritt engine designed to be operable also as a SIGE. In such an engine the smaller cylinder 14 is made large enough to accept a substantial quantity of fuel, for example up to 80 percent of the maximum fuel intake of the engine at full load (F of up to 80%). Generally speaking, the larger the smaller cylinder 14, the larger the proportion of fuel which can be admitted into it and be largely vaporised before ingression. The smaller cylinder 14 may have a swept volume ratio E of, for example, about 10% of the swept volume of the larger cylinder 12, although the relative sizes of the two cylinders is a matter of choice for the engine designer. The smaller cylinder may contain the whole of the combustion space 20 and may be constructed either in the Direct Ingression, Indirect Ingression or Intermediate Ingression embodiments. Spark assistance (STCI), using spark plug 52, is used to ignite fuel such as gasoline with engines in the Merritt mode using moderate compression ratios in the range 8:1 to 12:1. The spark ignites a small quantity of fuel when it ingresses from the first volume 15a in the smaller cylinder 14 into the combustion chamber space 20. The initial flame raises the pressure and temperature in the combustion space 20 to allow compression-ignition of the remaining fuel as the ingression process continues whilst fuel mixes with the air necessary for combustion. It is important to note that in this arrangement, the exact timing of the ignition process can be influenced by the timing of the ingression process as well as the timing of the spark event.

The hybrid engine will operate in the Merritt mode in the fuel ratio range of, for example, F=0% to 80%.

When operating with fuel ration F greater than, for example, 80% the Merritt engine in its pure mode changes to a conventional spark ignition gasoline engine. This may be achieved by discontinuing the fuel supply to the smaller cylinder 14 through injector 34 and, instead, starting the fuel supply to the intake manifold injector 82 shown in FIG. 23. This injector delivers a substantially stoichiometric fuel mixture to the inlet duct 25 of the larger cylinder 12. The fuel ratio in the range F=80% to 100% is now controlled to remain stoichiometric using the throttle 83 which was fully open when operating in the Merritt Mode but now closes partially at a fuel ratio of F=80% and opens fully at fuel ratio of F=100%.

In the pure SIGE mode injector 82 and throttle 83 provide a stoichiometric fuel/air mixture to the engine whilst in the pure Merritt mode injector 82 is inoperative, with injector 34 operative. Blending the necessary stoichiometric fuel quantity through both the injectors 34 and 82 simultaneously, is also a practical possibility.

FIG. 24 shows the four stroke sequence of operation of a Merritt SIGE hybrid engine in its pure SIGE mode. Fuel is delivered in the inlet manifold by injector 82 during the induction stroke of the larger piston 16 (FIG. 24a). Spark plug 52 ignites the stoichiometric mixture at the end of the compression stroke (FIG. 24b). The smaller piston 18 remains parked during the expansion stroke (FIG. 24c) and in so doing does not interfere With the combustion process. During the exhaust stroke (FIG. 24d) the injector 34 may be inoperative or alternatively it may deliver a small quantity of fuel, as shown, if injector 82 is made to deliver a slightly reduced fuel quantity. Delivering some fuel to the smaller cylinder 14 may assist in cooling the crown of the smaller piston to avoid pre-ignition problems.

Table IV summarises, by way of example, the Merritt/SIGE hybrid mode of operation. The quantities of fuel ratios F tabulated are chosen only for the purpose of illustration.

TABLE IV

Typically for a highly powered passenger vehicle
Swept Volume Ratio E = 10%
Fuel = Gasoline
Compression ratio = 8:1
Merritt mode - spark triggered compression ignition
SIGE mode - normal spark ignition
as illustrated in FIGS. 23 and 24

| Total Fuel Ratio F for engine (%) | F in smaller cylinder (%) | F in larger Cylinder (%) |
| --- | --- | --- |
| 10 | 10 | 0 unthrottled |
| 20 | 20 | 0 unthrottled |
| 50 | 50 | 0 unthrottled |
| 80 | 0 | 80 throttled |
| 100 | 0 | 100 unthrottled |

For the swept volume ratio E =10% the following values would apply:

Swept volume (larger cylinder)=400 cc

Swept volume (smaller cylinder)=40 cc

Additional combustion chamber volume (within the smaller cylinder)=17 cc

It will also be appreciated that a pure Merritt engine using gasoline fuel with spark triggered ignition is not a SIGE engine. Such a pure Merritt engine, shown in FIG. 5 in a Direct Ingression embodiment and in FIG. 21 in an Indirect Ingression embodiment, uses only one fuel supply 34, communicating with the first volume 15a in the smaller cylinder which delivers fuel during the induction stroke of the smaller piston. A pure Merritt engine can operate with gasoline fuel and use spark ignition and is nevertheless not a hybrid SIGE when operating in a pure Merritt mode.

With the Merritt/SIGE hybrid arrangement of FIGS. 24 and 25 the two combustion systems operate sequentially.

4 The Merritt/lean burn SIGE hybrid engine mode

FIG. 15 describes the operation in this mode. In this mode the smaller cylinder 14 can be of small volume ratio E. The purpose of this Merritt/hybrid mode is to assist the ignition of lean mixtures admitted to the larger cylinder through the inlet valve 24. In this hybrid form the Merritt and SIGE modes operate concurrently.

The swept volume ratio may, for example, be in the range of E =2% to 5%, and the fuel ratio F for operation in the pure Merritt Mode may be about 10%, for example. The engine can therefore idle in the pure Merritt mode but as power demand rises, some gasoline is supplied to the main air intake 25 to the larger cylinder by injector 82.

At low part load BMEP values a very lean mixture provided by injector 82 may not be ignitable even with the assistance of the Merritt mode. In such a case the throttle 83 is used to enrich the mixture admitted to the inlet valve 24 until such ignition is made possible. This condition is illustrated by way of an example in table V below at F value of 20% up to 50%.

TABLE V

Lean burn gasoline engine, torch ignited by Merritt mode
Swept Volume Ratio E = 4%
Fuel = Gasoline
Compression ratio 9:1
Merritt mode - spark triggered compression-ignition
as illustrated in FIG. 15

| Total Fuel Ratio F for engine (%) | F in smaller cylinder (%) | F in larger Cylinder (%) |
|---|---|---|
| 10 | 10 | 0 unthrottled |
| 20 | 10 | 10 throttled |
| 50 | 10 | 40 throttled |
| 80 | 10 | 70 unthrottled |
| 100 | 0 | 100 unthrottled |

For the swept volume ratio E=4% the following values would apply:

Swept volume (larger cylinder)=500 cc

Swept volume (smaller cylinder)=20 cc

Additional combustion chamber volume (in the larger piston crown)=40 cc

Plasma Ignition

Referring again to FIG. 15, the arrangement is suitable for a further application of this invention. The smaller cylinder can be used as a powerful spark-initiated plasma ignition source for both SIGE engine application, operating stoichiometrically, and diesel engine application, operating at lower compression ratios. In such an arrangement the smaller cylinder can have even a smaller volume ratio E sufficient for vaporising a suitable minimum fuel quantity.

Fuel injector 34 may deliver either a very small quantity of volatile fuel or alternatively gaseous fuel. Gaseous fuel may be dispensed during the induction stroke of the smaller piston by a small valve actuated by electric or pneumatic means. Hydrogen, propane or butane gas, for example may be suitable with a small cylinder swept volume ratio of as little as 1% or less. The operation of the engine as a Merritt/lean burn SIGE hybrid as shown in FIG. 15 or as a Merritt/diesel hybrid as shown in FIG. 16 remains similar to the processes described above but the purpose of diminishing the size of cylinder 14 is to provide the simplest way of enhancing ignition energy when compared with an unaided spark plug. Systems which provide spark plugs with a supply of hydrogen for instance are known as plasma jet igniters. The Merritt segregation process allows liquid butane, for instance, to be introduced to the smaller cylinder at low pressure during the induction stroke and remain segregated there until it is ignited by the spark plug following ingression. The resulting plasma jet will ignite the pre-mixed air fuel mixture of a SIGE engine or, alternatively, will greatly assist the ignition and combustion process of a diesel engine. Gasoline or other suitable fuels can also be used to produce plasma.

The miniature smaller cylinder 14 will need a smaller driving mechanism for piston 18 and this may be electrically or pneumatically operated.

The complete smaller cylinder and smaller piston assembly may be constructed as a screw-in attachment in the cylinder head to replace the unaided spark plug in SIGE engines or to aid ignition in diesel engines.

FIG. 22 shows some possible positions of the fuel injectors supplying the smaller cylinder 14 or the combustion chamber 20.

Tables VI and VII illustrate, by way of example, the diesel and stoichiometric petrol modes of operation of the engines of FIGS. 15 and 16, using plasma torch ignition of the Merritt mode.

TABLE VI

Plasma ignition - typically for a direct injection marine diesel engine
Swept Volume Ratio E = 0.5%
Torching Fuel = Gasoline
Compression ratio 16:1
Ignition - STCI

| Total Fuel Ratio F for engine (%) | F in smaller cylinder (%) | F in larger Cylinder (%) |
|---|---|---|
| 10 | 0.5 | 9.5 |
| 20 | 0.5 | 19.5 |
| 50 | 0.5 | 49.5 |
| 80 | 0.5 | 79.5 |
| 100 | 0.5 | 99.5 |

For the swept volume ratio E=0.5% the following values would apply:

Swept volume (larger cylinder)=5000 cc

Swept volume (smaller cylinder)=25 cc

Additional combustion chamber volume (provided in the larger piston crown)=305 cc The smaller piston is electrically actuated

TABLE VII

Plasma ignition - typically for a light goods vehicle with stoichiometric gasoline engine
Swept Volume Ratio E = 1%
Torching Fuel = Gasoline
Compression ratio 10:1
Ignition - STCI

| Total Fuel Ratio F for engine (%) | F in smaller cylinder (%) | F in larger Cylinder (%) |
|---|---|---|
| 10 | 1 | 9 |
| 20 | 1 | 19 |
| 50 | 1 | 49 |
| 80 | 1 | 79 |
| 100 | 1 | 99 |

For the swept volume ratio E=1% the following values would apply:

Swept volume (larger cylinder)=1000 cc

Swept volume (smaller cylinder)=10 cc

Additional combustion chamber volume=100 cc

The smaller piston is electrically actuated

The positioning of fuel injectors communicating with the smaller cylinder depends on the construction of the Merritt engine and its intended use. Various positions are shown in FIG. 22.

Injector 34 is positioned to allow a low pressure injector to supply fuel in the Merritt mode. This position has the advantage of the injector being shielded by the crown of the smaller piston during the period of expansion and most of the combustion process.

Injector position 6034 is suitable for either a pure Merritt mode or for an electronically actuated diesel injector in a diesel hybrid arrangement shown in FIGS. 19 and 20.

If this position is used in the Merritt mode the fuel injector must be able to withstand combustion pressures and temperatures, although it needs to deliver fuel such as gasoline only at low pressures. Pintle type injectors which open outwardly are suitable for such an application and they can be operated either by a jerk pump or electronically. If this position is used in the diesel hybrid mode, the injector must be able to deliver diesel fuel at high pressure, twice during one engine cycle.

Injector position 60 allows fuel to be injected evenly throughout the volume of the combustion chamber 20 and is most suitable for a high pressure diesel fuel injector operating as a Merritt/diesel hybrid engine using two injectors as shown in FIGS. 17 and 18.

FIG. 25 shows a Merritt/SIGE hybrid arrangement which uses a different cam profile 506 compared with the extended cam profile 500 shown so far. Cam profile 506 moves the smaller piston substantially in synchronism with the larger piston over the induction stroke (FIG. 25*a*) and the compression stroke (FIG. 25*b*). During the expansion stroke (FIG. 25*d*) and the exhaust stroke (FIG. 25*d*) of the larger piston 16, the cam allows the smaller piston to remain parked in its inner dead centre position. Such a cam profile can be used in all forms of the Merritt engine, including hybrid forms. Variations allowing the induction stroke of the smaller piston to start during the exhaust stroke of the larger piston, shown in (FIG. 25*d*), and to finish before the end of the induction stroke of the larger piston, shown in FIG. 25*a*, are also possible.

The cam profile 506 imparts higher velocities to the smaller piston during its induction stroke compared with the cam profile 500 and for this reason may be more suitable for use with larger, slower engines or with small values of volume ratio E.

FIG. 25 also shows an optional arrangement suitable for Merritt/SIGE hybrid engines where the drive, actuating the movement of the smaller piston 18, is disconnected when the engine is operating in a pure SIGE mode, and is reconnected when the engine is needed to operate in a Merritt engine mode. The cycle of operation illustrated in FIG. 25 is therefore the typical SIGE cycle of four stroke operation. Such disconnection can be used with any suitable cam profile or with any drive mechanism (e.g. electrical, mechanical or pneumatic) chosen to move the smaller piston and may also be applied to a Merritt/diesel hybrid engine.

I claim:

1. An internal combustion engine comprising:

at least one pair of first and second cylinders, said first cylinder having a larger swept volume than said second cylinder;

respective first and second pistons reciprocable in said cylinders, wherein said second piston has a drive stem and divides said second cylinder into a first volume containing said drive stem of said second piston and a second volume between said two pistons;

air inlet means communicating with said first cylinder;

exhaust means communicating with said first cylinder;

means defining a common combustion space between said pistons when said pistons are substantially at their inner dead centre positions, said combustion space comprising said second volume;

transfer means for enabling ingression flow of fuel/air mixture from said first volume into said second volume towards the end of the compression stroke of said second piston as it approaches its inner dead centre position;

segregating means for inhibiting movement of fuel/air mixture from said first volume into said second volume until said second piston approaches the end of its compression stroke;

a first fuel source for providing fuel to said first volume;

and drive means for driving said second piston, said drive means including means for maintaining said second piston substantially stationary at or adjacent its inner dead centre position during at least a portion of the expansion stroke of said first piston.

2. An engine according to claim 1 wherein:

the second piston has a crown with an edge which is radially spaced from the adjacent wall of said second cylinder to define a gap therebetween;

said transfer means comprises means which are formed at the end of said second cylinder remote from said first cylinder and which define a first by-pass around said edge of said second piston crown when said second piston is at or adjacent its inner dead centre position;

and wherein said spacing is of a size such as substantially to restrict the passage of gas between said side wall and said second piston crown from said first volume into said combustion space until towards the end of the compression stroke, said spacing thereby comprising said inhibiting means.

3. An engine according to claim 1 wherein:

the second piston has a crown with an edge which is radially spaced from the adjacent wall of said second cylinder to define a gap therebetween for enabling gas flow between said first and second volumes during the whole of the stroke of said second piston, said gap comprising said transfer means;

and said segregating means comprises the Relative Compression to Ingression Volume Ratio as herein defined of said first and second cylinders, said Relative Compression to Ingression Volume Ratio being equal to or greater than 1, as determined by the dimensions of said first and second pistons, their cylinders and their respective stroke lengths.

4. An engine according to claim 1 wherein:

the second piston has a crown with an edge which is radially spaced from the adjacent wall of said second cylinder to define a gap therebetween for enabling gas flow between said first and second volumes during the whole of the stroke of said second piston, said gap comprising said transfer means;

and said inhibiting means comprises coupling means between said first and second pistons such that, in use, a pressure difference is created across said gap to inhibit flow of fuel/air mixture from said first volume into said second volume until towards the end of the compression stroke of said second piston.

5. An engine according to claim 1 wherein:

said transfer means comprises means which are formed at the end of said second cylinder remote from said first cylinder and which define a first by-pass around said second piston when said second piston is at or adjacent its inner dead centre position;

and said inhibiting means comprises the Relative Compression to Ingression Volume Ratio as herein defined of said first and second cylinders, said Relative Compression to Ingression Volume Ratio being equal to or greater than 1.

6. An engine according to claim 1 wherein:

said transfer means comprises means which are formed at the end of said second cylinder remote from said first cylinder and which define a first by-pass around said second piston when said second piston is at or adjacent its inner dead centre position;

and said inhibiting means comprises coupling means between said first and second pistons such that, in use, a pressure difference is created across said gap to inhibit flow of fuel/air mixture from said first volume into said second volume until towards the end of the compression stroke of said second piston.

7. An engine according to claim 2 wherein:

said inhibiting means further comprises the Relative Compression to Ingression Volume Ratio as herein defined of said first and second cylinders, said Relative Compression to Ingression Volume Ratio being equal to or greater than 1.

8. An engine according to claim 2 wherein said first by-pass means is a groove formed in the wall of said second cylinder extending over at least a portion of the circumference of said second cylinder.

9. An engine according to claim 2 wherein:

said inhibiting means further comprises coupling means between said first and second pistons such that, in use, a pressure difference is created across said gap to inhibit flow of fuel/air mixture from said first volume into said second volume until towards the end of the compression stroke of said second piston.

10. An engine according to claim 1 wherein:

the second piston has a crown with an edge which is radially spaced from the adjacent wall of said second cylinder to define a gap therebetween for enabling gas flow between said first and second volumes during the whole of the stroke of said second piston;

said transfer means comprises said gap and means which are formed at the end of said second cylinder remote from said first cylinder and which define a first by-pass around the edge of said second piston crown when said second piston is at or adjacent its inner dead centre position;

and said inhibiting means comprises coupling means between said first and second pistons such that, in use, a pressure difference is created across said gap to inhibit flow of fuel/air mixture from said first volume into said second volume until towards the end of the compression stroke of said second piston.

11. An engine according to claim 1 wherein:

the second piston has a crown with an edge which is radially spaced from the adjacent wall of said second cylinder to define a gap therebetween for enabling gas flow between said first and second volumes during the whole of the stroke of said second piston;

said transfer means comprises said gap and means which are formed at the end of said second cylinder remote from said first cylinder and which define a first by-pass around the edge of said second piston crown when said second piston is at or adjacent its inner dead centre position;

and said inhibiting means comprises the Relative Compression to Ingression Volume Ratio as herein defined of said first and second cylinders, said Relative Compression to Ingression Volume Ratio being equal to or greater than 1.

12. An engine according to claim 1 wherein:

said inhibiting means comprises the Relative Compression to Ingression Volume Ratio as herein defined of said first and second cylinders, said Relative Compression to Ingression Volume Ratio being equal to or greater than 1, and coupling means between said first and second pistons such that, in use, a pressure difference is created across said gap to inhibit flow of fuel/air mixture from said first volume into said second volume until towards the end of the compression stroke of said second piston;

and wherein said transfer means comprises means which are formed at the end of said second cylinder remote from said first cylinder and which define a first by-pass around the edge of said second piston crown when said second piston is at or adjacent its inner dead centre position.

13. An engine according to claim 12 wherein:

the second piston has a crown with an edge which is radially spaced from the adjacent wall of said second cylinder to define a gap therebetween for enabling gas flow between said first and second volumes during the whole of the stroke of said second piston, said transfer means including said gap.

14. An engine according to claim 4 wherein said coupling is a mechanical coupling.

15. An engine according to claim 10 wherein said first by-pass means is a groove formed in the wall of said second cylinder extending over at least a portion of the circumference of said second cylinder.

16. An engine according to claim 8 wherein said first by-pass means is defined by a gradual enlargement of the bore of said second cylinder.

17. An engine according to claim 8 wherein said groove and said piston edge are shaped to provide, in cooperation, a diverging gap for assisting the mixing of fuel/air mixture flowing into said second volume with air in said second volume.

18. An engine according to claim 2 wherein said transfer means comprises means which are formed at the end of said second cylinder nearer said first cylinder and which define a second by-pass around said second piston when said second piston is at or adjacent its outer dead centre position.

19. An engine according to claim 18 wherein said second by-pass means has an axial length greater than the thickness of the edge of said second piston crown.

20. An engine according to claim 18 wherein said second by-pass means is a groove formed in the wall of said second cylinder extending over at least a portion of the circumference of said second cylinder.

21. An engine according to claim 18 wherein said second by-pass means is defined by an abrupt or gradual enlargement of the bore of said second cylinder.

22. An engine according to claim 1 wherein:

said stem of said second piston is sealingly and axially slidable in a bore in a cylinder head of the engine.

23. An engine according to claim 1 wherein:

said stem of said second piston is sealingly and axially slidable in a bore in a cylinder head of the engine;

and said engine further comprising passage means connecting said bore to said air inlet means for feeding leakage gases from said bore to said air inlet means.

24. An engine according to claim 1 comprising means for inducing swirl in gas flowing between said cylinders.

25. An engine according to claim 24 wherein said means for inducing swirl in gas flowing between said cylinders comprises a protrusion formed on the crown of said first piston and arranged to project into said second cylinder when said first piston approaches its inner dead centre position.

26. An engine according to clam 25 wherein said protrusion has an aperture for directing a jet of said gas flow in a predetermined direction.

27. An engine according to claim 24 wherein said means for inducing swirl in gas flowing between said cylinders comprises a restriction between said cylinders, said restriction having an aperture for directing a jet of said gas flow in a preset direction.

28. An engine according to claim 1 further comprising a partition between said first and second cylinders, said partition having an aperture for directing a jet of gas flow in a preset direction.

29. An engine according to claim 1 wherein said first fuel source is a low pressure fuel injector positioned so as to be shielded by said second piston during combustion.

30. An engine according to claim 1 wherein said first fuel source is a liquid fuel injector.

31. An engine according to claim 1 wherein said first fuel source is a gaseous fuel dispenser.

32. An engine according to claim 1 comprising means for igniting fuel in said combustion space.

33. An engine according to claim 32 wherein said ignition means comprises a spark plug, glow plug or other ignition device.

34. An engine according to claim 32 wherein a layer of catalytic material is placed a selected location in said combustion space.

35. An engine according to claim 8 having ignition means comprising a spark plug located in a cavity in said wall of said smaller cylinder, said cavity opening into said first by-pass means.

36. An internal combustion engine according to claim 1 wherein a second fuel source, in the form of a high pressure liquid fuel injector, is located such that when said second piston is at or adjacent its inner dead centre position said second fuel source can deliver to said combustion space, near said second piston, a quantity of fuel under pressure in addition to fuel supplied to said first volume by first said fuel source.

37. An internal combustion engine according to claim 36 having means for controlling said first fuel source to deliver into said first volume a proportion of the total fuel quantity to be delivered, starting and finishing when said second piston is at predetermined positions spaced from its inner dead centre position, and for controlling said second fuel source to deliver the remaining proportion of the total fuel quantity into said combustion space, near said second piston when said pistons are subsequently at or adjacent their inner dead centre positions.

38. An internal combustion engine according to claim 1 wherein said first fuel source is a high pressure fuel injector positioned in a wall of said second cylinder for delivering fuel directly into both said first and second volumes of said second cylinder.

39. An internal combustion engine according to claim 38 having means for controlling said fuel injector to deliver into said first volume a proportion of the total fuel quantity to be delivered starting and finishing when said second piston is at predetermined positions spaced from its inner dead centre position, and to deliver the remaining proportion of the total fuel quantity into said combustion space when said pistons are subsequently at or adjacent their inner dead centre positions.

40. An internal combustion engine according to claim 39 wherein said control means is operable to deliver the full quantity of fuel in two or more pulses or substantially continuously at a constant or variable rate of flow over a given period in such a way that the first said proportion of fuel is delivered into said first volume of said second cylinder during the induction and/or compression stroke of said smaller piston and the said further proportion of fuel is delivered to said combustion space substantially during a period beginning with the onset of or after ingression.

41. An engine according to claim 1 wherein a variable flow area valve means is positioned upstream of said air inlet means communicating with said first cylinder for enabling the restriction of air supply to said first cylinder.

42. An internal combustion engine according to claim 1 wherein:

a variable flow area valve means is positioned upstream of said air inlet means communicating with said first cylinder for enabling the restriction of air supply to said first cylinder;

and a second fuel source is provided in said air inlet means of said first cylinder for providing a spark ignitable fuel/air mixture to enable the engine to operate in a SIGE mode.

43. An engine according to claim 1 further comprising:

a second fuel source for providing fuel to said first cylinder;

a variable flow area valve means is positioned upstream of said air inlet means communicating with said first cylinder for enabling the restriction of air supply to said first cylinder;

means for igniting fuel in said combustion space;

control means for controlling said ignition means;

and means for ensuring that the pressure and temperature reached in said combustion space near the end of the compression stroke are insufficient to cause spontaneous compression ignition of the fuel used.

44. An engine according to claim 43 wherein said ignition means comprises a spark plug located in a cavity in said wall of said smaller cylinder.

45. An internal combustion engine according to claim 43 having control means for controlling said first and second fuel sources and said variable flow area valve means to change over the engine between said SIGE mode, in which said first fuel source is inoperative or substantially inoperative and said variable flow area valve means controls the fuel/air mixture inducted into said first cylinder to be substantially stoichiometric, and STCI mode in which said second fuel source is inoperative or substantially inoperative and said variable flow area valve means is substantially fully open.

46. An engine according to claim 1 wherein idling of the engine can be effected by introducing fuel from said first fuel source into air delivered to said first volume of said second cylinder;

wherein said mixture is ingressed into said combustion space after admitting a throttled amount of substantially air only into said first cylinder to limit the compression temperature to below compression ignition value;

and wherein said mixture is ignited by a spark plug when said piston is in a suitable position relative to inner dead centre position.

47. An engine according to claim 1 wherein said combustion space includes said second volume of said second cylinder and also an additional portion of said first cylinder.

48. An engine according to claim 1 wherein said first piston has a projection protruding into said second cylinder at the inner dead centre position of said first piston, whereby said combustion space is then positioned within the remaining portion of said second cylinder not occupied by said projection.

49. An engine according to claim 1 wherein said maintaining means is operable to maintain said second piston substantially stationary at or adjacent its inner dead centre position during at least a portion of the expansion stroke and exhaust stroke of said first piston.

50. An engine according to claim 1 wherein said drive means is operable to move said second piston over a smaller percentage of its stroke than said first piston during a first portion of the compression stroke of said second piston and to accelerate said second piston over the latter part of the compression stroke to cause said first and second pistons to arrive at their inner dead centre positions substantially simultaneously.

51. An engine according to claim 50 wherein:
said second piston has biassing means urging said second piston towards its inner dead centre position;
said drive means includes cam means for moving said second piston;
and said cam means is profiled to disengage from said second piston over a portion of its angular movement to allow said second piston to accelerate over the latter part of the compression stroke.

52. An engine according to claim 1 wherein said drive means includes cam means for moving said second piston.

53. An engine according to claim 1 wherein said drive means is operable to move said second piston over its induction stroke during both the exhaust and induction strokes of said first piston.

54. An engine according to claim 1 wherein said drive means is operable to move said second piston over its induction stroke whilst said first piston moves over its induction stroke.

55. An engine according to claim 1 further comprising means for maintaining said second piston substantially at its inner dead centre position during each cycle of said first piston, thereby to enable the engine to operate as a conventional engine.

56. An engine according to claim 1 wherein said drive means comprises electric, pneumatic or hydraulic actuator means.

57. A method of operating an internal combustion engine according to claim 1 wherein the method comprises:
introducing a first preselected quantity of fuel into said first volume during the time the second piston is moving in a stroke selected from among its induction stroke, its compression stroke, and its induction and compression stroke;
introducing a second preselected quantity of fuel into said first cylinder during the induction stroke of said first piston to provide a preselected fuel/air ratio mixture in said first cylinder;
discharging ignition energy into said combustion space after the commencement of ingression and prior to the completion of ingression to ignite a portion of the ingressing fuel, thereby to cause ignition of said fuel/air mixture previously inducted into said first cylinder.

58. A method according to claim 57 wherein said preselected fuel/air mixture in said first cylinder is leaner than stoichiometric.

59. A method according to claim 57 wherein said preselected fuel/air mixture in said first cylinder is substantially stoichiometric.

60. A method of operating an internal combustion engine according to claim 1 wherein the method comprises:
introducing a first preselected quantity of a first fuel into said first volume induction and/or compression stroke of said second during the time the second piston is moving in a stroke selected from among its induction stroke, compression stroke, and its induction and compression stroke; and discharging ignition energy into said combustion space after the commencement of ingression and prior to the completion of ingression to ignite a portion of the ingressing fuel, thereby to raise the temperature and pressure in said combustion space to levels sufficient to ignite by compression ignition the remainder of the ingressing fuel.

61. A method according to claim 60 further comprising introducing a further preselected quantity of fuel into said first cylinder during the induction stroke of said first piston whilst controlling the quantity of air inducted into said first cylinder to provide a preselected fuel/air ratio mixture in said first cylinder.

62. A method according to claim 61 wherein said preselected fuel/air mixture is substantially stoichiometric.

63. A method according to claim 60 wherein the air inducted into said first cylinder is throttled to control the end of compression temperatures and pressures to levels insufficient to cause compression ignition prior to the discharge of ignition energy into said combustion space.

64. A method according to claim 60 wherein said first preselected quantity of fuel is ignited by a spark to generate said ignition energy.

65. A method according to claim 60 wherein said first preselected quantity of fuel is ignited by compression ignition to generate said ignition energy.

66. A method according to claim 60 further comprising:
injecting a second preselected quantity a second of liquid fuel under high pressure into said combustion space towards the end of the compression stroke of said second piston for ignition by compression ignition.

67. A method according to claim 66 wherein said first preselected quantity of fuel is injected into said first volume of said second cylinder during the induction stroke of said second piston.

68. A method according to claim 66 wherein said second liquid fuel is low octane or high cetane fuel and said first fuel is a volatile, higher octane fuel.

69. A method according to claim 68 wherein said first fuel is gasoline.

70. A method according to claim 68 wherein said second fuel is diesel fuel.

71. A method according to claim 60 wherein said second piston undergoes an induction stroke over at least part of the exhaust and induction strokes of said first piston.

72. A method according to claim 71 wherein said second piston undergoes an induction stroke over substantially all of the exhaust and induction strokes of said first piston.

73. A method according to claim 60 wherein the compression stroke of said second piston takes place over substantially all of the compression stroke of said first piston.

74. A method according to claim 60 wherein said second piston remains substantially stationary at its inner dead centre position over substantially all of the expansion stroke of said first piston.

75. A method according to claim 60 wherein said second piston remains substantially stationary at its inner dead centre position over substantially all of the exhaust and expansion strokes of said first piston.

76. An engine according to claim 15 having ignition means comprising a spark plug located in a cavity in said wall of said smaller cylinder, said cavity opening into said first bypass means.

* * * * *